United States Patent
Yoo et al.

(10) Patent No.: US 11,163,109 B2
(45) Date of Patent: Nov. 2, 2021

(54) FIBER PREFORM, OPTICAL FIBER, METHODS FOR FORMING THE SAME, AND OPTICAL DEVICES HAVING THE OPTICAL FIBER

(71) Applicant: Nanyang Technological University, Singapore (SG)

(72) Inventors: Seongwoo Yoo, Singapore (SG); Xiaosheng Huang, Singapore (SG)

(73) Assignee: Nanyang Technological University, Singapore (SG)

( * ) Notice: Subject to any disclaimer, the term of this patent is extended or adjusted under 35 U.S.C. 154(b) by 3 days.

(21) Appl. No.: 16/629,872

(22) PCT Filed: Jun. 20, 2018

(86) PCT No.: PCT/SG2018/050301
§ 371 (c)(1),
(2) Date: Jan. 9, 2020

(87) PCT Pub. No.: WO2019/013701
PCT Pub. Date: Jan. 17, 2019

(65) Prior Publication Data
US 2021/0080644 A1    Mar. 18, 2021

(30) Foreign Application Priority Data

Jul. 13, 2017 (SG) .......................... 10201705769W
Nov. 24, 2017 (SG) .......................... 10201709726R

(51) Int. Cl.
*G02B 6/02* (2006.01)
*C03B 37/012* (2006.01)
*G01B 9/02* (2006.01)

(52) U.S. Cl.
CPC ...... *G02B 6/02042* (2013.01); *C03B 37/0122* (2013.01); *C03B 37/01222* (2013.01);
(Continued)

(58) Field of Classification Search
CPC ............................................ C03B 37/01222
See application file for complete search history.

(56) References Cited

U.S. PATENT DOCUMENTS

| 5,931,983 A | 8/1999 | Bloom |
| 9,658,393 B2 * | 5/2017 | Digiovanni ....... C03B 37/01217 |
| (Continued) | | |

FOREIGN PATENT DOCUMENTS

| CN | 103091771 A | 5/2013 |
| CN | 204331086 U | 5/2015 |
| WO | WO 2015/144181 | 10/2015 |

OTHER PUBLICATIONS

M. Chen, J. Zhou and E. Y. B. Pun, "A Novel WDM Component Based on a Three-Core Photonic Crystal Fiber," in Journal of Lightwave Technology, vol. 27, No. 13, pp. 2343-2347, Jul. 1, 2009. (Year: 2009).*

(Continued)

*Primary Examiner* — Rhonda S Peace
(74) *Attorney, Agent, or Firm* — Womble Bond Dickinson (US) LLP

(57) ABSTRACT

According to embodiments of the present invention, a fiber preform or an optical fiber is provided. The fiber preform or the optical fiber includes a core region having a plurality of cores, wherein two cores of the plurality of cores are bridged by an air gap, and a cladding arrangement including a first cladding region having a plurality of structures surrounding the core region, and a second cladding region in between the core region and the first cladding region, the second cladding region having a plurality of tubes, wherein at least one split is defined in the second cladding region. According to further embodiments of the present invention, a method for forming the fiber preform, a method for forming the optical fiber, an optical coupler having the optical fiber, an optical (Continued)

combiner having the optical fiber, and an optical apparatus having the optical fiber are also provided.

18 Claims, 15 Drawing Sheets

(52) U.S. Cl.
CPC ..... *G01B 9/02049* (2013.01); *G02B 6/02366* (2013.01); *C03B 2203/12* (2013.01); *C03B 2203/16* (2013.01); *C03B 2203/32* (2013.01); *C03B 2203/34* (2013.01); *C03B 2203/42* (2013.01)

(56) References Cited

U.S. PATENT DOCUMENTS

| | | | |
|---|---|---|---|
| 10,370,280 B2* | 8/2019 | Gibson | C03B 17/04 |
| 10,393,956 B2* | 8/2019 | Russell | C03B 37/02781 |
| 2004/0223678 A1 | 11/2004 | He et al. | |
| 2005/0226578 A1* | 10/2005 | Mangan | G02B 6/02328 385/125 |
| 2008/0124036 A1 | 5/2008 | Miyabe et al. | |
| 2008/0205837 A1 | 8/2008 | Gallagher et al. | |
| 2009/0220785 A1* | 9/2009 | Monro | C03B 37/01274 428/397 |
| 2010/0054742 A1* | 3/2010 | Imamura | G02B 6/02042 398/79 |
| 2016/0124144 A1* | 5/2016 | Benabid | G02B 6/02328 385/125 |
| 2016/0252673 A1 | 9/2016 | Fini et al. | |
| 2017/0097464 A1 | 4/2017 | Challener et al. | |
| 2017/0160467 A1* | 6/2017 | Poletti | G02B 6/024 |
| 2020/0115270 A1* | 4/2020 | Yoo | C03B 37/0124 |
| 2020/0241200 A1* | 7/2020 | Wang | G02B 6/02304 |
| 2020/0278491 A1* | 9/2020 | Poletti | G02B 6/02328 |

OTHER PUBLICATIONS

Yue-e Chen, Qiu-feng Shao, Yong Wang, "Study on sensing characteristics of three-core photonic crystal fibers," Proc. SPIE 9297, International Symposium on Optoelectronic Technology and Application 2014: Laser and Optical Measurement Technology; and Fiber Optic Sensors, 92973A (Dec. 3, 2014). (Year: 2014).*
"Laser Lab," Retrieved from the internet Oct. 14, 2019, http://www.edkm.physik.uni-potsdam.de/research-interests/laser-lab.
Fini, J.M., et al., "Polarization maintaining single-mode low-loss hollow-core fibres," Nature Communications, vol. 5, pp. 1-7, 2014.
Hanafi, M., et al., "Development of a Variable Fiber Optic Coupler", 2005 13th IEEE International Conference on Networks Jointly held with the 2005 IEEE 7th Malaysia International Conference on Communications, Nov. 16-18, 2005, 70-73.
Hassan, M. R. A., et al., "Cavity based mid-IR fiber gas laser pumped by a diode laser," Optica, vol. 3(3), pp. 218-221, (2016).
Huang, X., et al., "Double layer hollow core anti-resonant fiber for small core and low loss characteristics", 2017 Conference on Lasers and Electro-Optics (CLEO), pp. 1-2, 2017.
Huang, X., et al., "Function of second cladding layer in hollow core tube lattice fibers", Scientific Reports, vol. 7, pp. 1-8, 2017.
Huang, X., et al., "Hollow-core air-gap anti-resonant fiber couplers", Optics Express, vol. 25(23), pp. 29296-29306, 2017.
Huang, X., et al., "Sensing applications of double hollow-core antiresonant fiber based modal interferometer", Conference on Lasers and Electro-Optics, OSA Technical Digest (Optical Society of America, 2018), paper AF1M.3, 2018.
Kawasaki, B.S., et al., "A Single-Mode-Fiber Coupler with a Variable Coupling Ratio", Journal of Lightwave Technology, vol. LT-1(1), pp. 176-178, 1983.
Kuschnerov, M., et al., "Transmission of Commercial Low Latency Interfaces Over Hollow-Core Fiber," Journal of Lightwave Technology, vol. 34(2), pp. 314-320, 2016.
Liu, X., et al., "Dual-core antiresonant hollow core fibers", Optics Express, vol. 24(15), pp. 17453-17458, 2016.
Malka, D., et al., "Design of 4×1 Power Beam Combiner Based on MultiCore Photonic Crystal Fiber", Applied Sciences, vol. 7(695), pp. 1-9, 2017.
Malka, D., et al., "Fiber-laser monolithic coherent beam combiner based on multicore photonic crystal fiber", Optical Engineering, vol. 54(1), pp. 011007(1-5), Jan. 2015.
Meng, L., et al., "Bend Tunable Coupling in Dual-Hallow-Core Photonic Bandgap Fiber," Optical Fiber Communication Conference and Exposition (OFC/NFOEC), 2012 and the National Fiber Optic Engineers Conference. 1-3 (IEEE).
Poletti, F., et al., "Towards high-capacity fibre-optic communictions at the speed of light in vacuum," Nature Photonics, vol. 7, pp. 279-284, (2013).
Wang, Z. et al., "Coupling and decoupling of dual-core photonic bandgap fibers," Optics Letters, vol. 30(19), pp. 2542-2544, (2005).
Wheeler, N.V., et al., "Dual Hollow-Core Anti-Resonant Fibres", Micro-Structured and Speciality Optical Fibres IV, vol. 9886, pp. 988617(1-7), 2016.

* cited by examiner

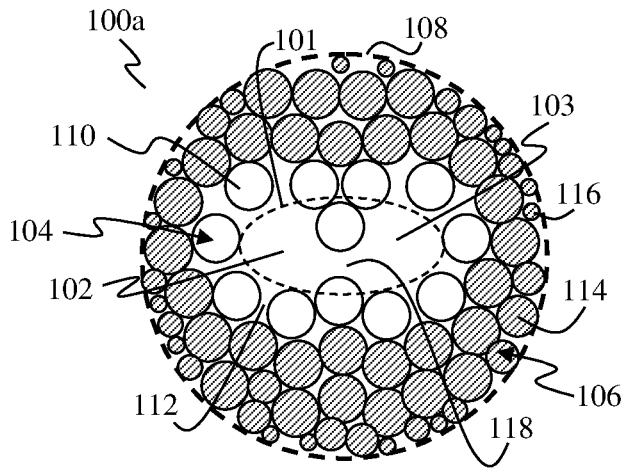
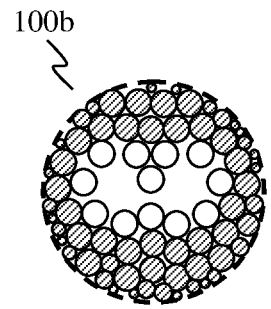
FIG. 1A  FIG. 1B
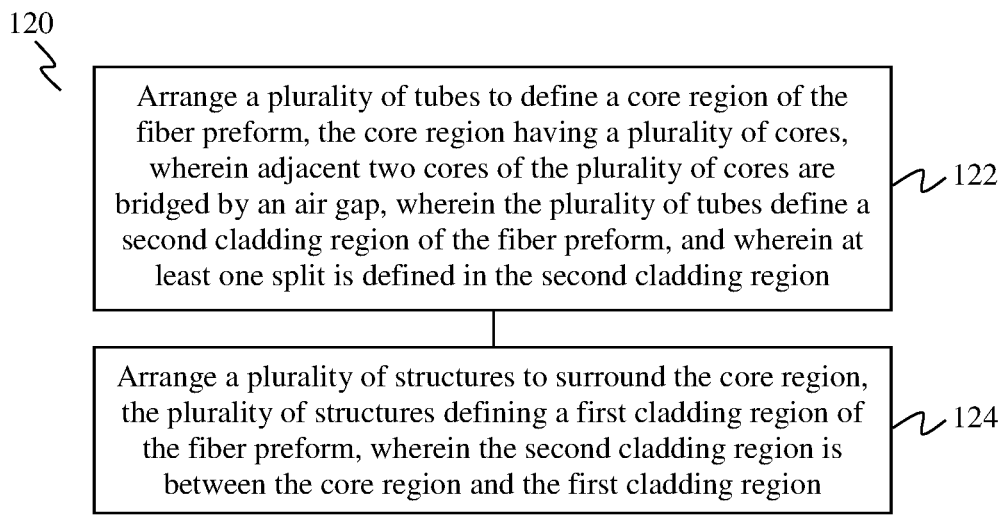
FIG. 1C
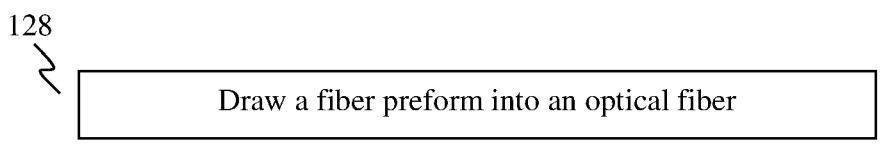
FIG. 1D

FIG. 1G                    FIG. 1I

FIBER PREFORM, OPTICAL FIBER, METHODS FOR FORMING THE SAME, AND OPTICAL DEVICES HAVING THE OPTICAL FIBER

CROSS-REFERENCE TO RELATED APPLICATIONS

This application is a national stage filing under 35 U.S.C. § 371 of PCT/SG2018/050301, filed 20 Jun. 2018, which International Application was published by the International Bureau in English on 17 Jan. 2019, and which claims the benefit of priority of Singapore patent application No. 10201705769W, filed 13 Jul. 2017, and No. 10201709726R, filed 24 Nov. 2017, which applications are hereby incorporated by reference in their entirety in this application.

TECHNICAL FIELD

Various embodiments relate to a fiber preform, an optical fiber, a method for forming a fiber preform, a method for forming an optical fiber, an optical coupler having the optical fiber, a method including changing a light coupling ratio of the optical fiber, an optical combiner having the optical fiber, a method for optical combining, an optical apparatus having the optical fiber, and a method for forming an optical apparatus.

BACKGROUND

A fiber optic coupler is a fiberized component used as an essential building block to a fiber-based optical system such as a fiber laser, a fiber resonator, a fiber interferometer, a fiber communication network, to name a few. The fiber coupler possesses multiple inputs and outputs to manipulate optical signals to split, combine, multiplex, de-multiplex, switch and interleave. Known fiber couplers are composed of two solid fibers thermally fused side by side. A typical telecommunication fiber is used to fabricate the known couplers. Hence, it inherits all the drawbacks of solid core fibers, e.g., limited transmission window in visible and near infrared, low damage threshold and high nonlinearity. These drawbacks can be overcome by applying hollow core photonic crystal fibers. However, the known fiber coupler fabrication technique is not applicable because the thermal fusing process can damage the photonic crystal cladding of the fiber. For this reason, fabricating dual hollow core fibers has been pursued to be an alternative way to realize hollow core fiber couplers.

Hollow-core anti-resonant fibers (HAFs) has become one of the most popular air core fiber designs, with properties of multiple broad transmission bands, simple and flexible cladding structures, and relatively low transmission loss. The air core guidance opens up a new route to deliver mid-IR (infrared) as well as ultrafast pulses. While the majority of work related to HAFs has been focused on geometries with a single core within the cladding structure, a dual core HAF is promising to serve as a hollow-core fiber coupler that inherits the properties of HAF.

All the prior works, albeit scarce, make use of a resonant coupling mechanism between the two cores. The resonant coupling based coupler has fundamental limitations to be adopted for use in real applications. Most of prior dual core HAF designs possess cladding struts between the cores (also true for other dual hollow-core fibers). Consequently, the core mode must transverse the cladding material to transfer its power, and thus, suffering material limitations of the cladding. That is, the two cores are separated by glass cladding struts, and the optical signal in one core must go through the glass struts for achieving the coupling. Hence, the cladding struts located between the air cores sacrifice the advantages of air-core guidance, and the benefits from air cores cannot be utilized. More importantly, the cladding struts separating the air cores induce strong modal confinement in the cores and inhibit the formation of supermodes, and thus, preventing mode coupling between cores. Further, its optical characteristics are limited as much as the constituent materials in aspects of narrow transmission window, high dispersion and high nonlinearity. Furthermore, its coupling is wavelength dependent, thus very narrow operational window, and its coupling is incomplete with a transfer of 65% only.

Although mode coupling between the dual core was observed by flatting out the silica wall (strut), which weakens modal confinement, the coupling performance showed drawbacks such as limited achievable coupling strength, wavelength sensitive coupling strength, polarization dependent coupling strength, and relatively high transmission loss (>1 dB/m).

In contrast, optical power coupling can be achieved via an air channel in an anti-resonant fiber design. In order to maximize the air core benefits and improve the coupling performance, it is desired to replace the solid wall (or strut) with an air layer between air cores. A dual-core anti-resonant hollow core fiber having a dual core bridged by an air channel was theoretically investigated as a dual core HAF. Unlike the other fiber couplers (including dual air core fibers), studies suggested that the dual core anti-resonant fibers (DCAFs) support light coupling through the air channel, hence overcoming all the material limited drawbacks. The fiber is polarization independent with a relative low transmission loss at 0:1 dB/m level. Nonetheless, there has been no demonstration of a DCAF because of difficulty in realizing the design as the proposed elliptical design may be deemed impractical for fabrication. The design that has been proposed relies on elliptical tubes where it is difficult to maintain the shape during high temperature fiber drawing.

There have also been prior efforts on developing a mid-IR fused fiber coupler via fusing and stretching ZBLAN or chalcogenide fibers. Challenges in obtaining reliable mid-IR coupler with this approach arose from weak physical strength of the soft glass fibers. The fibers broke while being stretched, resulting in short fused length and partial coupling. In contrast, an air-core air-gap fiber coupler can reach to the mid-IR without the material restriction.

SUMMARY

The invention is defined in the independent claims. Further embodiments of the invention are defined in the dependent claims.

According to an embodiment, a fiber preform is provided. The fiber preform may include a core region having a plurality of cores, wherein two cores of the plurality of cores are bridged by an air gap, and a cladding arrangement including a first cladding region having a plurality of structures surrounding the core region, and a second cladding region in between the core region and the first cladding region, the second cladding region having a plurality of tubes, wherein at least one split is defined in the second cladding region.

According to an embodiment, an optical fiber is provided. The optical fiber may include a core region having a plurality of cores, wherein two cores of the plurality of cores are bridged by an air gap, and a cladding arrangement including a first cladding region having a plurality of structures surrounding the core region, and a second cladding region in between the core region and the first cladding region, the second cladding region having a plurality of tubes, wherein at least one split is defined in the second cladding region.

According to an embodiment, a method for forming a fiber preform is provided. The method may include arranging a plurality of tubes to define a core region of the fiber preform, the core region having a plurality of cores, wherein two cores of the plurality of cores are bridged by an air gap, wherein the plurality of tubes define a second cladding region of the fiber preform, and wherein at least one split is defined in the second cladding region, and arranging a plurality of structures to surround the core region, the plurality of structures defining a first cladding region of the fiber preform, wherein the second cladding region is between the core region and the first cladding region.

According to an embodiment, a method for forming an optical fiber is provided. The method may include drawing the fiber preform as described herein into the optical fiber.

According to an embodiment, an optical coupler is provided. The optical coupler may include the optical fiber as described herein, and means for changing a light coupling ratio between the plurality of cores of the optical fiber.

According to an embodiment, a method including changing a light coupling ratio between the plurality of cores of the optical fiber as described herein is provided.

According to an embodiment, an optical combiner is provided. The optical combiner may include the optical fiber as described herein, wherein the core region of the optical fiber includes three cores.

According to an embodiment, a method for optical combining is provided. The method may include supplying a first light to a first core of the three cores of the optical combiner as described herein, and supplying a second light to a second core of the three cores.

According to an embodiment, an optical apparatus is provided. The optical apparatus may include the optical fiber as described herein, and at least one optical device optically coupled to the optical fiber.

According to an embodiment, a method for forming an optical apparatus is provided. The method may include optically coupling the optical fiber as described herein, and at least one optical device to each other.

BRIEF DESCRIPTION OF THE DRAWINGS

In the drawings, like reference characters generally refer to like parts throughout the different views. The drawings are not necessarily to scale, emphasis instead generally being placed upon illustrating the principles of the invention. In the following description, various embodiments of the invention are described with reference to the following drawings, in which:

FIG. 1A shows a schematic cross-sectional view of a fiber preform, according to various embodiments.

FIG. 1B shows a schematic cross-sectional view of an optical fiber, according to various embodiments.

FIG. 1C shows a flow chart illustrating a method for forming a fiber preform, according to various embodiments.

FIG. 1D shows a method for forming an optical fiber, according to various embodiments.

FIG. 1G shows a schematic view of an optical combiner, according to various embodiments.

FIG. 1I shows a schematic view of an optical apparatus, according to various embodiments.

FIG. 3A shows a plot of transmission spectra collected from output ports of a dual core anti-resonant fiber (DCAF), while

FIG. 4A shows a schematic view of a setup for varying a light coupling ratio in a dual core anti-resonant fiber (DCAF), according to various embodiments, while

FIG. 5B shows a plot of the relationship between signal power and launched pump power at different coupling ratios for the laser cavity of FIG. 5A, while

FIG. 13A shows schematic views of asymmetric core fibers, while

DETAILED DESCRIPTION

Figure 1E:
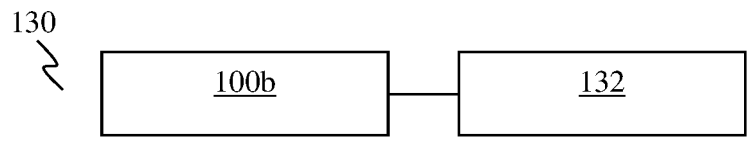
FIG. 1E shows a schematic view of an optical coupler, according to various embodiments.

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, logical, and electrical changes may be made without departing from the scope of the invention. The various embodiments are not necessarily mutually exclusive, as some embodiments can be combined with one or more other embodiments to form new embodiments.

Embodiments described in the context of one of the methods or devices are analogously valid for the other methods or devices. Similarly, embodiments described in the context of a method are analogously valid for a device, and vice versa.

Features that are described in the context of an embodiment may correspondingly be applicable to the same or similar features in the other embodiments. Features that are described in the context of an embodiment may correspondingly be applicable to the other embodiments, even if not explicitly described in these other embodiments. Furthermore, additions and/or combinations and/or alternatives as described for a feature in the context of an embodiment may correspondingly be applicable to the same or similar feature in the other embodiments.

In the context of various embodiments, the articles "a", "an" and "the" as used with regard to a feature or element include a reference to one or more of the features or elements.

In the context of various embodiments, the phrase "at least substantially" may include "exactly" and a reasonable variance.

In the context of various embodiments, the term "about" as applied to a numeric value encompasses the exact value and a reasonable variance.

As used herein, the term "and/or" includes any and all combinations of one or more of the associated listed items.

As used herein, the phrase of the form of "at least one of A or B" may include A or B or both A and B. Correspondingly, the phrase of the form of "at least one of A or B or C", or including further listed items, may include any and all combinations of one or more of the associated listed items.

Various embodiments may provide an air core anti-resonant fiber and a variable air core anti-resonant fiber coupler. Example embodiments describe a design and a fabrication method for an air core anti-resonant fiber coupler.

Various embodiments may provide a multi-hollow core fiber having a cladding region including a plurality of layers of micro or submicro-sized rods or capillaries, the cladding region surrounding a main hollow core portion, a plurality of cladding capillaries arranged within the main hollow core portion to form two or more hollow cores, wherein an air gap is formed in a boundary between two adjacent hollow cores.

Various embodiments may provide robust air-core air-gap light coupling in a dual hollow-core anti-resonant fiber (DHAF) (also known as dual-core anti-resonant fiber (DCAF)), based on an anti-resonant design. The DHAF may be directly drawn using a fiber drawing tower, thus, enabling continuous volume fabrication. The developed DHAF inherits the anti-resonant guiding mechanism of a single core HAF. Hence, transmission band may be readily tuned for application wavelengths unlimited by material transmission. Its coupling strength may be controllable by adjusting design parameters. Further, the coupling strength may be linearly variable with a longitudinal tension, and the entire anti-resonant transmission band may be coupled. This may be useful for ultrafast pulse coupling. The robust coupling mechanism has been verified, being implemented as an output fiber coupler in a laser ring cavity. Moreover, the DHAF retains the superiority of air-core anti-resonant guidance, as will be described further below, by delivering and splitting a 47 fs laser pulse without inducing any significant pulse broadening. Therefore, the DHAF of various embodiments has the potential to work as a mid-IR and/or ultrafast fiber coupler.

The present disclosure also describes the applications of the multiple air core fibers composed of plural air cores for optical wave propagation.

FIG. 1A shows a schematic cross-sectional view of a fiber preform 100a, according to various embodiments. The fiber preform 100a includes a core region (illustratively traced by dashed oval 101) having a plurality of cores 102, 103, wherein two cores 102, 103 of the plurality of cores 102, 103 are bridged by an air gap 118, and a cladding arrangement including a first cladding region 106 having a plurality of structures (shown as circles with stripes, where two structures are represented by 114, 116) surrounding the core region 101, and a second cladding region 104 in between the core region 101 and the first cladding region 106, the second cladding region 104 having a plurality of tubes (shown as open circles, where one tube is represented by 110), wherein at least one split 112 is defined in the second cladding region 104.

In other words, a fiber preform 100a may be provided. The fiber preform 100a may include a core region 101, and a cladding arrangement or structure around or surrounding the core region 101. A plurality of cores 102, 103 may form or define the core region 101. As a non-limiting example, a first core 102 and a second core 103 may be defined. The core region 101, and the cores 102, 103, as may be appreciated, means a part where light, or at least a substantial portion or majority portion of the light, may travel or propagate. For example, light may travel in at least one of the plurality of cores 102, 103. The core region 101 may be centrally located within the preform 100a. The core region 101 may be a hollow or air region, meaning that the preform 100a may have a hollow core region 101. This may also mean that each of the cores 102, 103 may be a hollow or air core.

In various embodiments, the plurality of cores 102, 103 may be arranged side by side. The plurality of cores 102, 103 may be arranged along a straight line or may be arranged in the shape of a circle, or any polygonal shape, including, for example, a square or a hexagon.

In the context of various embodiments, the plurality of cores 102, 103 may include at least two cores, including, for example, two, three, four, five or any higher number of cores.

Two cores 102, 103 may be bridged by a respective air gap 118. In other words, the cores 102, 103 may be physically and/or fluidly connected to each other via an air gap 118. In various embodiments, each pair of cores of the plurality of cores 102, 103 may be bridged by a respective air gap 118. The two cores 102, 103, or each pair of cores may be adjacent cores.

The cladding arrangement may have two (distinct) regions: first and second cladding regions 104, 106. The cladding arrangement may further include an overcladding (shown as a dashed circle 108), which is the outermost cladding layer or jacket.

The first cladding region 106 may include a plurality of structures 114, 116. The plurality of structures 114, 116 may be of different sizes or diameters. The plurality of structures 114, 116 may be a plurality of elongate structures. The plurality of structures 114, 116 may include a plurality of (hollow) tubes and/or a plurality of (solid) rods. The tubes and/or the rods may be arranged in different layers and/or may be mixed with one another.

The first cladding region 106, and, therefore, the plurality of structures 114, 116, may surround or enclose the core region 101, forming a ring around the circumference of the core region 101. The plurality of structures 114, 116 may also surround the second cladding region 104.

In some embodiments, the first cladding region 106, and, therefore, the plurality of structures 114, 116, may surround or enclose entirely the core region 101. In this way, the plurality of structures 114, 116 may form a full ring around the entire circumference of the core region 101. The plurality of structures 114, 116 may also entirely surround the second cladding region 104.

The second cladding region 104 may be located or arranged sandwiched between the core region 101 and the first cladding region 106, where the second cladding region 104 may include a plurality of tubes (or capillaries) 110. The plurality of tubes 110 may be elongate tubes. The second cladding region 104 may surround the core region 101. In this way, the plurality of tubes 110 may form a ring around the circumference of the core region 101. As may be appreciated, the second cladding region 104 may be a tube or capillary cladding region. It should be appreciated that the second cladding region 104 may include one or more structures other than the tubes 110. The plurality of tubes (or all the tubes) 110 may have the same wall thickness.

In the context of various embodiments, a "ring" may be of any shape, including, but not limited to, a circle, an ellipse, a square or a rectangle.

At least one split 112 may be defined in the second cladding region 104. As a result, a split (capillary) cladding structure may be provided. The at least one split 112 may extend in a direction from the core region 101 to the first cladding region 106 (or conversely from the first cladding region 106 to the core region 101). The at least one split 112 may refer to a separation void (or gap) or a continuous void (or gap) (intentionally) defined in the second cladding region 104. In various embodiments, a plurality of splits may be defined in the second cladding region 104.

The at least one split 112 may be defined between adjacent tubes of the plurality of tubes 110. As a result of the at least one split 112, adjacent tubes 110 may be completely separated or spaced apart from each other. The at least one split 112 may refer to a void between adjacent tubes 110 to space apart the adjacent tubes 110, rather than referring to the interstitial sites or spaces between the adjacent tubes 110. This may mean that there may be spacings in between adjacent tubes of the plurality of tubes 110, meaning that one or more tubes 110 may be spaced apart from one or more other tubes 110.

As described above, the second cladding region 104 may be proximal to the core region 101 while the first cladding region 106 may be distal to the core region 101. This means that, starting from the inner portion of the preform 100a and extending outwardly, is the core region 101, followed by the second cladding region 104, and then the first cladding region 106. Accordingly, the second cladding region 104 may be an inner cladding region while the first cladding region 106 may be an outer cladding region.

In various embodiments, the cladding arrangement may have a (effective) refractive index that is different from that of the core region 101. The first cladding region 106 and the second cladding region 104 may have the same or different (effective) refractive indices.

In various embodiments, the preform 100a may be formed by stacking a plurality of tubes 110 and structures 114, 116.

In the context of various embodiments, each or a respective core 102, 103 may be of any shape and/or size (or cross-section dimension or diameter). The shape and/or size of each or a respective core 102, 103 may be determined, at least in part, by the arrangement or configuration of the first cladding region 106 and/or the second cladding region 104. As a non-limiting example, each or a respective core 102, 103 may have a circular cross-sectional shape. However, it should be appreciated that other shapes may be possible, including, for example, ellipse, square or rectangle.

In the context of various embodiments, each or a respective structure 114, 116 may be of any shape and/or size (or cross-section dimension or diameter). As a non-limiting example, each or a respective structure 114, 116 may have a circular cross-sectional shape. However, it should be appreciated that other shapes may be possible, including but not limited to, ellipse, square or rectangle. It should be appreciated that the plurality of structures 114, 116 may have the same or different shapes and/or sizes.

In the context of various embodiments, each or a respective tube 110 may be of any shape and/or size (or cross-section dimension or diameter). As a non-limiting example, each or a respective tube 110 may have a circular cross-sectional shape. However, it should be appreciated that other shapes may be possible, including but not limited to, ellipse, square or rectangle. It should be appreciated that the plurality of tubes 110 may have the same or different shapes and/or sizes.

The plurality of structures 114, 116 may have different shapes and/or sizes as compared to the plurality of tubes 110.

In the context of various embodiments, a rod may be an elongate rod. The rod may be sealed or close-ended at the two (opposite) ends. The rod may be a (completely) solid rod. This may mean that the rod may not be hollow.

In the context of various embodiments, a tube may be an elongate tube. The tube may be unsealed or open-ended at the two (opposite) ends. The tube may be a capillary or capillary tube. The tube may be hollow. The tube may be an air tube. As a non-limiting example, the second cladding region 104 may provide a plurality of cladding holes or voids, e.g., air holes.

In various embodiments, the air gap 118 may be defined offset from a center of the core region 101, for example, defined proximal to one side (e.g., bottom) of the core region 101. This may mean that the air gap 118 (or its center thereof) may not be aligned coaxially with the central points of the plurality of cores 102, 103 or may not be aligned coaxially with the central axis running through the plurality of cores 102, 103. The off-center positioning of the air gap 118 may be helpful for achieving single mode operation.

In various embodiments, the at least one split 112 may extend through the second cladding region 104 entirely in a direction from the core region 101 to the first cladding region 106. As a result, a split (capillary) cladding structure may be provided. There may be a plurality of splits 112 extending through the second cladding region 104 entirely in respective directions or along respective axes from the core region 101 to the first cladding region 106.

In various embodiments, the at least one split 112 may extend in a radial direction from a core of the plurality of cores 102, 103 to the first cladding region 106. The at least one split 112 may extend through the entire width of the second cladding region 104 defined in the radial direction. As may be appreciated, the radial direction in this context may be defined as the direction originating from the central point or axis of the associated core and extending outwardly towards a boundary (or perimeter) of the fiber preform 100a.

In various embodiments, the at least one split 112 may be defined between adjacent single tubes of the plurality of tubes 110.

In various embodiments, the plurality of tubes 110 may be arranged in one layer surrounding the core region 101.

In various embodiments, the plurality of structures 114, 116 may be arranged in a plurality of layers surrounding the core region 101. The plurality of structures 114, 116 may be arranged in a plurality of concentric layers. The plurality of layers of structures 114, 116 may be arranged one after the other in the radial direction of the fiber preform 100a. All layers of the structures 114, 116 may (entirely) surround the core region 101. Each layer may be in the form of a ring around the core region 101. The plurality of layers of structures 114, 116 may include two, three or any higher number of layers or rings.

In the context of various embodiments, the fiber preform 100a refers to the material from which an optical fiber may be derived or drawn. This may mean that the fiber preform 100a may refer to the initial material as formed or stacked (e.g., a primary fiber preform), or may refer to a cane (e.g., a secondary fiber preform), which is a smaller or thinner version drawn from the primary fiber preform.

FIG. 1B shows a schematic cross-sectional view of an optical fiber 100b, according to various embodiments. The optical fiber 100b may be obtainable or obtained by drawing of the fiber preform 100a into the optical fiber 100b. This may mean that the optical fiber 100b is substantially similar or identical to the configuration or arrangement of the fiber preform 100a except for the smaller dimension or size. In details, the optical fiber 100b includes a core region having a plurality of cores, wherein two cores of the plurality of cores are bridged by an air gap, and a cladding arrangement including a first cladding region having a plurality of structures surrounding the core region, and a second cladding region in between the core region and the first cladding region, the second cladding region having a plurality of tubes, wherein at least one split is defined in the second cladding region. It should be appreciated that descriptions in the context of the fiber preform 100a may correspondingly be applicable in relation to the optical fiber 100b.

In the context of various embodiments, a stack-and-draw technique may be used to form the fiber preform 100a and the optical fiber 100b. The plurality of tubes 110 and the plurality of structures 114, 116 may be suitably stacked to form the fiber preform 100a. The plurality of tubes 110 and the plurality of structures 114, 116 may be stacked within an overcladding 108. The fiber preform 100a that is formed may then be drawn into the optical fiber 100b. The fiber preform 100a may first be drawn into an intermediate cane structure prior to drawing into the final optical fiber 100b.

In the context of various embodiments, the optical fiber 100b may be a multiple-core anti-resonant fiber, having a multiple (e.g., dual) hollow-core anti-resonant fiber structure.

In the context of various embodiments, during use or operation of the optical fiber 100b, light may be provided to one or more cores of the plurality of cores. The optical fiber 100b may be employed to receive non-polarised lights or polarised lights. The optical fiber 100b may allow light coupling between at least two cores of the plurality of cores. Light coupling may occur between (adjacent) two cores through or across the air gap bridging the (adjacent) two cores. The optical fiber 100b may also allow light or beam splitting.

In various embodiments, the optical fiber 100b may further include a sensing (or functional) material. The sensing material may be provided in the core region, e.g., in at least one core of the plurality of cores, and/or in the cladding arrangement, e.g., at the second cladding region. The sensing material may be provided or coated on an inner surface of the core, or may fill the core. The sensing material may be used for detecting the presence of an analyte. Accordingly, the optical fiber 100b may be used as or form part of an optical sensor. As a non-limiting example, the tubes 110 may be coated with one or more functional materials that may adsorb heavy metal ions. The optical fiber 100b may then, for example, be used to detect heavy metal ion concentration in water. As the heavy metal ions are adsorbed on the functional material(s) on the walls of the tubes 110, the wall thickness, t, may vary with the concentration of heavy metal ions in water. As the tube wall thickness, t, may determine the transmission spectrum of the optical fiber 100b, by measuring the transmission spectrum, the variance of the wall thickness, t, may be determined, and the concentration of the heavy metal ions may be determined.

In various embodiments, the optical fiber 100b may act or function as an in-fiber interferometer, e.g., for sensing or in sensing applications. Accordingly, the optical fiber 100b may be used as or form part of an interferometer based optical sensor.

FIG. 1C shows a flow chart 120 illustrating a method for forming a fiber preform, according to various embodiments.

At 122, a plurality of tubes are arranged (or stacked) to define a core region of the fiber preform, the core region having a plurality of cores, wherein two cores of the plurality of cores are bridged by an air gap, wherein the plurality of tubes define a second cladding region of the fiber preform, and wherein at least one split is defined in the second cladding region. The two cores may be adjacent cores.

At 124, a plurality of structures are arranged (or stacked) to surround the core region, the plurality of structures defining a first cladding region of the fiber preform, wherein the second cladding region is between the core region and the first cladding region.

The first cladding region and the second cladding region may define or form part of a cladding arrangement around the core region.

In various embodiments, the first cladding region and the second cladding region may be jacketed with or enclosed within an overcladding.

In various embodiments, the air gap may be defined offset from a center of the core region.

In various embodiments, the at least one split may extend through the second cladding region entirely in a direction from the core region to the first cladding region.

In various embodiments, the at least one split may extend in a radial direction from a core of the plurality of cores to the first cladding region.

In various embodiments, the at least one split may be defined between adjacent single tubes of the plurality of tubes.

In various embodiments, at 124, the plurality of structures may be arranged in a plurality of layers surrounding the core region.

It should be appreciated that descriptions in the context of the fiber preform 100a may correspondingly be applicable in relation to the method for forming a fiber preform described in the context of the flow chart 120.

FIG. 1D shows a method for forming an optical fiber, according to various embodiments. At 128, a fiber preform as described herein is drawn into an optical fiber.

FIG. 1E shows a schematic view of an optical coupler 130, according to various embodiments. The optical coupler 130 includes the optical fiber 100b, and means 132 for changing a light coupling ratio between the plurality of cores of the optical fiber 100b. In other words, the means 132 may be provided to control the ratio of light coupling between or into different cores of the plurality of cores of the optical fiber 100b. For example, the light coupling ratio may be varied so that the amount of light coupled into one core may increase while the amount of light coupled into another core may decrease.

In various embodiments, for changing the light coupling ratio, the means 132 may cause structural deformation of the optical fiber 100b. As a non-limiting example, the width of the air gap of the optical fiber 100b may be changed due to the structural deformation.

In various embodiments, for changing the light coupling ratio, the means 132 may apply a (longitudinal) force to the optical fiber 100b. The force may be a tensile force to stretch the optical fiber 100b, or a compressive force to compress or contract the optical fiber 100b. The optical fiber 100b may be linearly or longitudinally stretched or contracted. By stretching or contracting the optical fiber 100b, a coupling ratio of the optical fiber 100b may be varied. For example, with a tensile force, the amount of light coupled into a first core may increase while the amount of light coupled into a second core may decrease, while, with a compressive force, the amount of light coupled into the first core may decrease while the amount of light coupled into the second core may increase. Accordingly, in various embodiments, tension induced structural deformation of the optical fiber 100b may lead to tension induced coupling ratio of the optical fiber 100b.

In various embodiments, the means 132 may include two support structures arranged to support the optical fiber 100b, wherein the two support structures may be adapted to provide a relative movement between the two support structures. In this way, as a result of the relative movement, a tensile force or a compressive force may be applied to the optical fiber 100b.

The optical fiber 100b may be coupled or affixed to the two support structures. Different parts of the optical fiber 100b may be coupled or affixed to the two support structures. As a non-limiting example, a first end region (e.g., input end region) of the optical fiber 100b may be coupled to a first support structure while a second (opposite) end region (e.g., output end region) of the optical fiber 100b may be coupled to a second support structure.

At least one of the two support structures may be movable, e.g., the support structure which the output end region of the optical fiber may be coupled to may be movable. The other of the two support structures may be fixed or movable. The movable structure(s) may be (linearly) moved to extend or contract the optical fiber 100b.

In various embodiments, the two support structures may be stages. As a non-limiting example, a movable support structure may be a (linear) translation stage. The movable support structure may be motorised.

In various embodiments, the optical coupler 130 may further include a light source optically coupled to the optical fiber 100b to provide an input light to the optical fiber 100b.

Figure 1F:
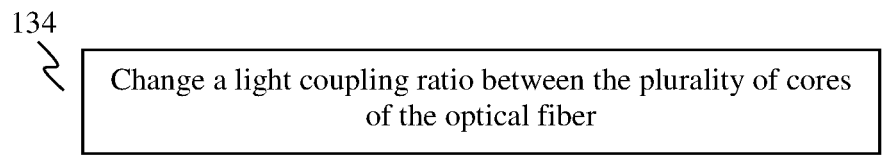
FIG. 1F shows a method including changing a light coupling ratio between the plurality of cores of the optical fiber as described herein, according to various embodiments.

FIG. 1F shows a method 134 including changing a light coupling ratio between the plurality of cores of the optical fiber as described herein, e.g., optical fiber 100b. This may include structurally deforming the optical fiber. A force may be applied to the optical fiber to structurally deform the optical fiber.

Changing the light coupling ratio may include controlling a relative movement between two support structures supporting the optical fiber, for example, by moving at least one of the two support structures.

Various embodiments may provide an optical combiner having the optical fiber as described herein, wherein the core region of the optical fiber includes (at least) three cores.

FIG. 1G shows a schematic view of an optical combiner 136, according to various embodiments. The optical (light or beam) combiner 136 includes an optical fiber 100g having a core region with three cores 102g, 103g, 105g. Two (adjacent) cores 102g, 103g are bridged by an air gap 118g, and two (adjacent) cores 103g, 105g are bridged by an air gap 119g. The optical fiber 100g may have a cladding arrangement as described in the context of the fiber preform 100a. Further, it should be appreciated that descriptions in the context of the fiber preform 100a may correspondingly be applicable in relation to the optical fiber 100g.

In various embodiments, the three cores 102g, 103g, 105g may be arranged side by side. The three cores 102g, 103g, 105g may be arranged along a straight line.

During operation, lights may be launched into first and second cores 102g, 105g of the optical fiber 100g. During propagation of the first and second lights through the first and second cores 102g, 105g respectively, the first and second lights may be coupled to the third core 103g and combine to form a third (resultant) light. The third light may have a power that is higher than the respective power of each of the first and second lights. For example, the third light may have a power that is at least substantially equal to the sum of powers of the first and second lights.

The optical fiber 100g may be employed to receive non-polarised lights or polarised lights. As the (anti-resonant) optical fiber 100g may be low birefringent, the optical fiber 100g may combine non-polarised input lights as long as the input lights are in phase. Nevertheless, using polarised input lights may lead to higher combining efficiency.

Further, the optical fiber 100g with the air core guidance may have the potential for much higher power handling capacity without being damaged, which is not feasible in known solid core counterparts. Further, the optical fiber 100g may or does not degrade light (or beam) brightness after combining. Therefore, the optical fiber 100g may provide a high power high brightness beam combiner, which is not achievable in known solid core fiber combiners.

It should be appreciated that the core region of the optical fiber 100g may include more than three cores, for example, four, five or any higher number of cores so as to allow more lights or beams to be combined.

In various embodiments, the optical combiner 136 may further include an optical arrangement configured to supply a first light to a first core of the three cores, and a second light to a second core of the three cores.

The first light may be of a first polarization direction, and the second light may be of a second polarization direction. The first and second polarization directions are different polarization directions, e.g., orthogonal polarization directions. During propagation through the optical fiber 100g, the first and second lights may be coupled to the third core 103g and combine to form a third (resultant) light having the first and second polarization directions.

As a non-limiting example, the optical arrangement may include a first optical source to supply the first light and a second optical source to supply the second light.

As a further non-limiting example, the optical arrangement may include one or more polarizing elements configured to receive an input light and further configured to change a polarization direction and/or polarization state of the input light to provide (or generate) the first and second lights. The polarizing element(s) may include polarizer, polarizing filter, polarizing beamsplitter, waveplate, etc. The optical arrangement may further include an optical source configured to supply the input light.

Figure 1H:
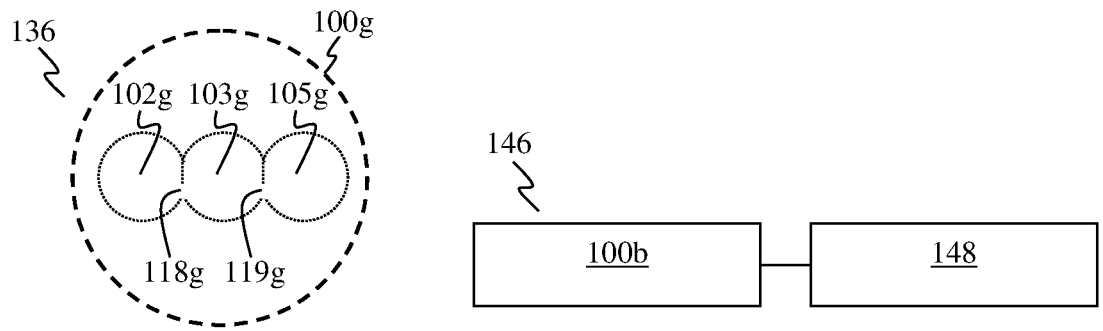
FIG. 1H shows a flow chart illustrating a method for optical combining, according to various embodiments.
Figure 1H:
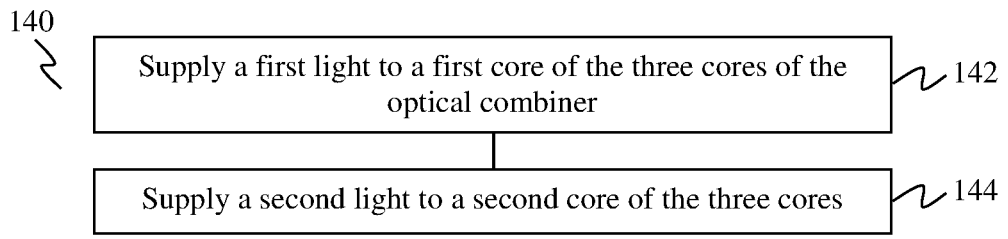

FIG. 1H shows a flow chart 140 illustrating a method for optical combining, according to various embodiments.

At 142, a first light is supplied to a first core of the three cores of the optical combiner as described herein.

At 144, a second light is supplied to a second core of the three cores.

The first light may be of a first polarization direction, and the second light may be of a second (different) polarization direction, e.g., orthogonal polarization directions.

FIG. 1I shows a schematic view of an optical apparatus 146, according to various embodiments. The optical apparatus 146 includes the optical fiber 100b, and at least one optical device 148 optically coupled to the optical fiber 100b.

A plurality of the optical fibers 100b may be optically coupled to the at least one optical device 148, and/or a plurality of optical devices may be optically coupled to the optical fiber 100b.

In various embodiments, the at least one optical device 148 may include, but not limited to, at least one of a waveguide, an optical element (e.g., a lens or a beamsplitter), another optical fiber, an optical source, an optical detector, an optical transmitter, or an optical receiver.

In various embodiments, the optical apparatus 146 may be or may include a fiber laser. The optical fiber 100b may define or form part of the laser cavity, and/or act as an output coupler.

In various embodiments, the optical apparatus 146 may be or may include a spectroscopy apparatus. The optical device 148 may be or may include a femtosecond laser.

In various embodiments, the optical apparatus 146 may be or may include a multiplexing/demultiplexing apparatus.

In various embodiments, the optical apparatus 146 may be or may include an interferometer. Lights outputted from the plurality of cores of the optical fiber 100b may cooperate to generate an interference pattern. Lights of at least substantially similar powers may be provided to the plurality of cores, which may subsequently generate a stronger interference pattern.

In various embodiments, the at least one optical device 148 may include a tapered optical fiber optically coupled to a core of the plurality of cores of the optical fiber 100b. The tapered optical fiber may have a tapering region arranged proximal to the core. The tapered optical fiber may be arranged on one end region of the core or on one end side of the optical fiber 100b. The tapered optical fiber may be spliced or butt coupled to the optical fiber 100b. The tapered optical fiber may have a core portion optically coupled or aligned to the core of the optical fiber 100b.

In various embodiments, a plurality of tapered optical fibers may be provided optically coupled to the optical fiber 100b. Respective tapered optical fibers may be optically coupled to a respective core of the plurality of cores of the optical fiber 100b, and arranged on opposite end sides of the optical fiber 100b. Each of the plurality of tapered optical fibers may be as described above.

In various embodiments, the at least one optical device 148 may include an asymmetric core fiber optically coupled to a core of the plurality of cores of the optical fiber 100b. The asymmetric optical fiber may be arranged on one end region of the core or on one end side of the optical fiber 100b. The asymmetric optical fiber may be spliced or butt coupled to the optical fiber 100b. The asymmetric optical fiber may have an off-centered core portion optically coupled or aligned to the core of the optical fiber 100b.

In various embodiments, a plurality of asymmetric optical fibers may be provided optically coupled to the optical fiber 100b. Respective asymmetric optical fibers may be optically coupled to a respective core of the plurality of cores of the optical fiber 100b, and arranged on opposite end sides of the optical fiber 100b. Each of the plurality of asymmetric optical fibers may be as described above.

Figure 1J:
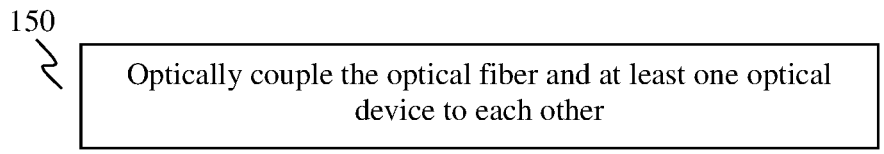
FIG. 1J shows a method for forming an optical apparatus, according to various embodiments.

FIG. 1J shows a method for forming an optical apparatus, according to various embodiments. At 150, the optical fiber as described herein, and at least one optical device are optically coupled to each other.

In the context of various embodiments, an optical coupler may mean the optical fiber of various embodiments, and/or a variable optical coupler having the optical fiber and means for changing a light coupling ratio between the plurality of cores of the optical fiber.

Various embodiments may provide multiple-core anti-resonant fibers. As non-limiting examples, description will be provided herein with respect to dual-core anti-resonant fibers (DCAFs) or dual hollow-core anti-resonant fibers (DHAFs). Nevertheless, the description in the context of DCAFs or DHAFs may correspondingly be applicable to anti-resonant fibers of various embodiments having more than two cores, which may be employed in place of DCAFs or DHAFs. Further, as the optical fiber of various embodiments may itself operate as an optical coupler, the optical fiber may also be described or identified as a fiber coupler, or simply a coupler.

The DCAFs may be fabricated using the stack-and-draw technique. The pristine anti-resonant characteristics may be well maintained in the DCAFs. As will be described further below, optical power coupling is demonstrated in the fabricated DCAFs, which may find applications in, among others, low latency air core fiber communication network, mid-infrared fiber laser, resonator and interferometer, and switchable ultrafast beam delivery/splitting.

Figure 2A:
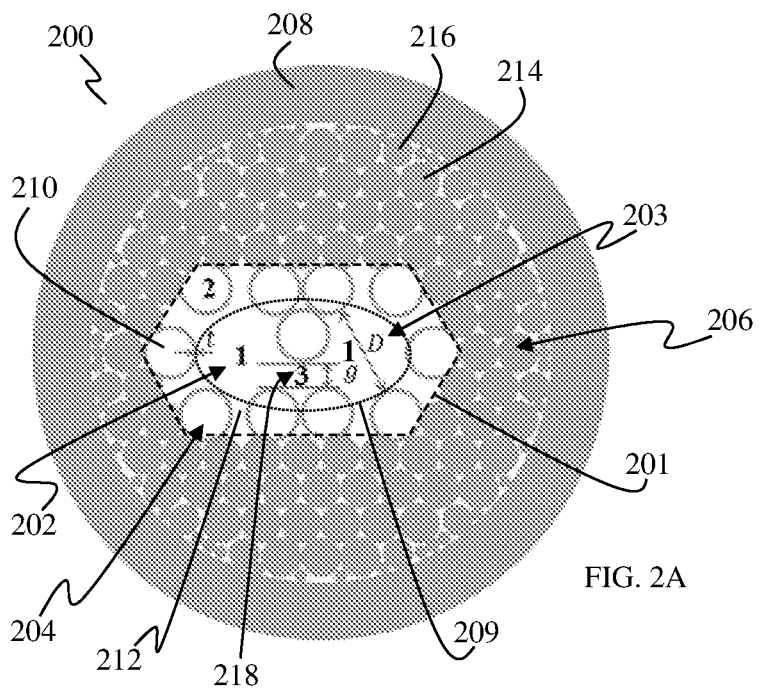
FIG. 2A shows a schematic cross-sectional view of a hollow core anti-resonant fiber.
Figure 2B:
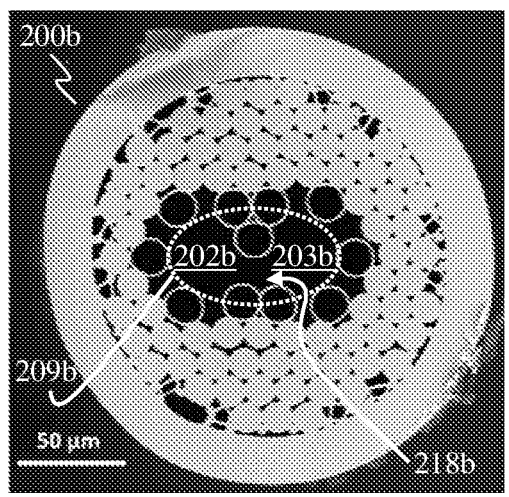
FIG. 2B shows a microscopy image of a cross-sectional view of a fabricated hollow core anti-resonant fiber.
Figure 2D:
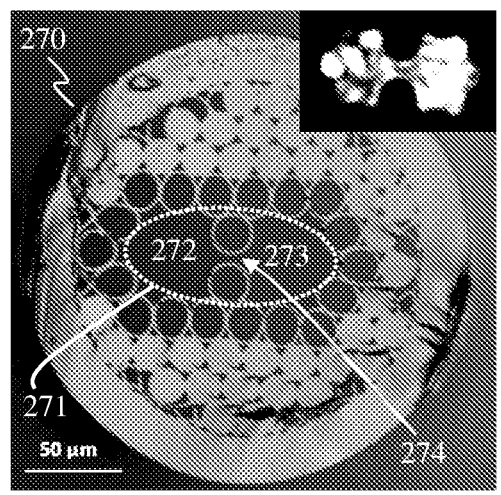
FIG. 2D shows a microscopy image of a cross-sectional view of a fabricated hollow core anti-resonant fiber.
Figure 2C:
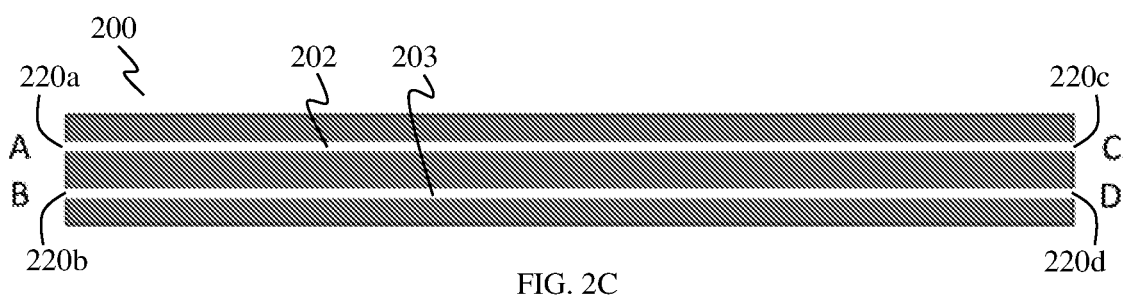
FIG. 2C shows a schematic side cross-sectional view of the fiber of FIG. 2A, according to various embodiments.

FIGS. 2A-2C show schematic cross-sectional views of a hollow core anti-resonant fiber (coupler) 200, 200b, illustrating a dual-core anti-resonant fiber (coupler) (DCAF). As shown in FIG. 2A, the designed DCAF 200 may include two hollow cores (labelled "1") 202, 203 which may be connected to each other through a gap (labelled "3") 218. One layer of cladding capillaries (labelled "2") 210 may surround the hollow cores 202, 203 to form an anti-resonant waveguide. An external cladding region may be constructed with rods 214, 216 to ease fabrication complexity. The rods 214, 216 may be differently sized. In FIG. 2A, t is the capillary wall thickness, g is the air (or channel) gap width, and D is the core diameter.

A DCAF 200b fabricated by the stack and draw technique is shown in FIG. 2B, which has a similar structure as the DCAF 200, and including two hollow cores 202b, 203b. The fabricated fiber 200b has a good structure which demonstrates the superiority, feasibility and practicality of the design of various embodiments. For the fiber 200b, t=1.21 μm, D=35.2 μm and g=11.5 μm.

FIG. 2C shows the side cross-sectional view of the DCAF 200 and illustrates that the DCAF 200 may serve as a 2×2 fiber coupler with two input ports or ends (port A 220a and port B 220b) and two output ports or ends (port C 220c and port D 220d).

As may be observed, in one embodiment, an optical fiber 200 may be provided, having a cladding region comprising a plurality of layers of (nano)rods 214, 216, the cladding region surrounding a main hollow core portion (illustratively traced by dashed line 201). The optical fiber 200 may include a plurality of cladding capillaries 210 arranged within the main hollow core 201 to form a core region (illustratively traced by dotted oval 209) having two or more cores 202, 203. An air gap 218 is formed in a boundary between the two adjacent cores 202, 203. The air gap 218 may be bounded by circular capillaries 210. The air gap 218 may be defined off-center of the core region 209, e.g., proximal to one side (e.g., bottom) of the core region 209. This may mean that the air gap 218 may not be aligned coaxially with the central points of the cores 202, 203, or may not be aligned coaxially with the central axis running through the cores 202, 203. The off-center positioning of the air gap 218 may be helpful for achieving single mode operation. Such an off-center air gap may also be observed for the air gap 218b of the fiber 200b being off center of the core region 209b.

In greater details, the DCAF 200 may include an overcladding 208, within which are arranged a plurality of differently-sized rods 214, 216 defining a cladding region (e.g., a first cladding region) 206 and a plurality of tubes or capillaries 210 defining another cladding region (e.g., a second cladding region) 204, where both cladding regions 204, 206 surround a core region having two cores, for example, a first core (e.g., core 1) 202, and a second core (e.g., core 2) 203 bridged by an air gap 218. The plurality of rods 214, 216 may entirely surround the cores 202, 203. The tubes 210 may be arranged in one layer or ring around the cores 202, 203. The rods 214, 216 may be arranged in a plurality layers or rings around the cores 202, 203.

A plurality of splits 212 may be defined through the cladding region 204 entirely in a radial direction from a respective core 202, 203 to the cladding region 206. In other words, the splits 212 may be defined through the entire width of the cladding region 204 defined in the radial direction associated with a corresponding core 202, 203. The splits 212 may be defined to completely separate or space apart adjacent tubes 210.

FIG. 2D shows a microscopy image of a cross-sectional view of a fabricated hollow core anti-resonant fiber 270. The optical fiber 270 may include a core region (illustratively traced by dotted oval 271) including two cores 272, 273 bridged by an air gap 274. The air gap 274 may be defined at the center of the core region 271. This may mean that the air gap 274 may be aligned coaxially with the central points of the cores 272, 273. The air cores 272, 273 have large diameters (>50 μm) in order to maintain the air gap 274 between the air cores 272, 273 to enable the inter-core mode coupling. However, resulting from the large cores 272, 273, the higher order mode contents may significantly increase and the fundamental mode content could not be observed, which is implied by the near field mode image shown in the Inset of FIG. 2D. However, this may be mitigated or solved with designs having core diameters <35 μm by placing the air gap at or towards the bottom side of the core region, e.g., fiber 200 (FIG. 2A).

Various embodiments may further provide a (variable) fiber optic coupler. The optical coupler may include the optical fiber as described herein (e.g., DCAF 200, FIG. 2A), a first translation stage on which an input end of the optical fiber may be mounted and a second translation stage on which an output end of the optical fiber may be mounted. A movement of the second translation stage in the light transmission direction of the optical fiber may cause a change in the coupling ratio of the two or more cores (e.g., 202, 203, FIG. 2A).

As non-limiting examples, where the optical fiber may have two cores, the coupling ratio of a first core may decrease and the coupling ratio of a second core may increase as the second translation stage moves in the light transmission direction of the optical fiber. This may be due to the tension applied on the optical fiber as the second translation stage moves in the light transmission direction of the optical fiber. The first translation stage may be fixed. The coupling ratio of the first core may increase and the coupling ratio of the second core may decrease as the second translation stage moves in a direction opposite to the light transmission direction of the optical fiber.

Figure 3A:
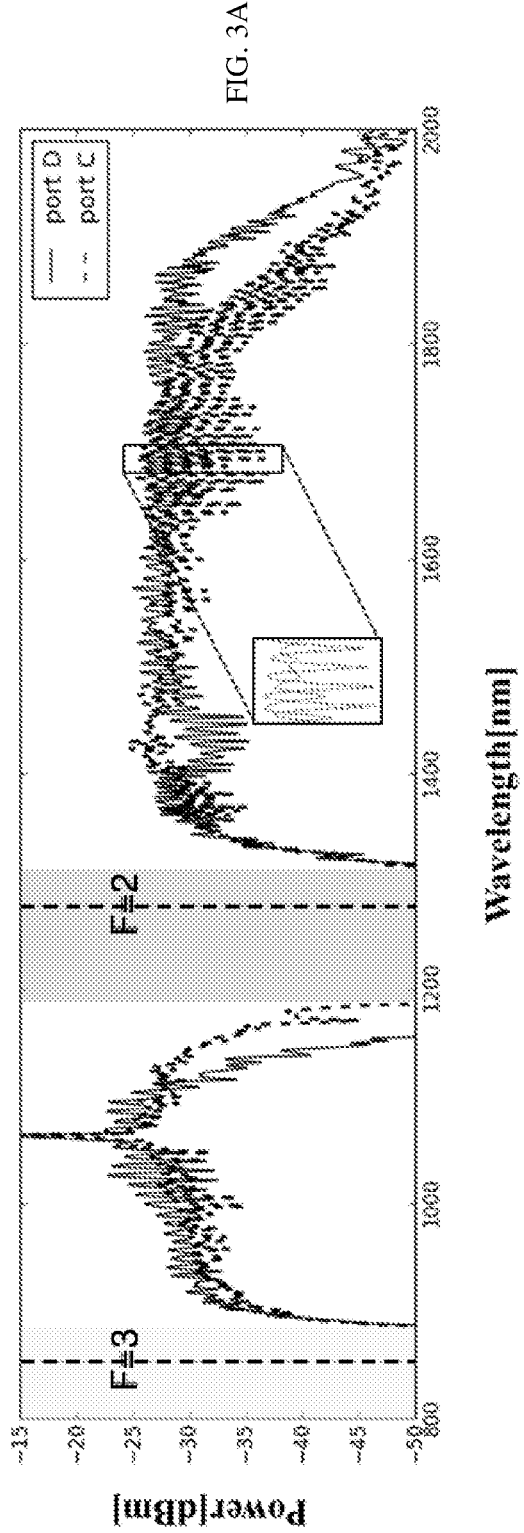

There are two geometry parameters which may determine the performance of a DCAF. One parameter is the capillary wall thickness t, which is related to the transmission property based on the antiresonant waveguide mechanism, i.e., $F=2t\sqrt{n^2-1}/\lambda$, where F is the normalized frequency, n is the refractive index of the cladding material (e.g., 1.45) and λ is the wavelength. When F closes to an integer, there may be a high loss region, and a low loss transmission band exists between every adjacent high loss regions. This may be evidenced by FIG. 3A in which the measured transmission spectrum of a hollow core anti-resonant fiber follows the antiresonant waveguide mechanism. FIG. 3A shows a plot of transmission spectra measured at port C (see FIG. 2C, 220c) and port D (see FIG. 2C, 220d) (corresponding to cores 202, 203 respectively) for a 50:50 coupling setting, with port A (see FIG. 2C, 220a) (corresponding to core 202) serving as the input port, and 1.21 µm capillary wall thickness (t). The shaded areas in FIG. 3A correspond to high resonant regions. As may be observed, the transmission properties witness the anti-resonant characteristics of the DHAF. For both transmission spectra collected, the transmission bands are determined by the normalized frequency, F, confirming its anti-resonant property. The fine oscillation feature of the spectrum or the interference pattern of the transmission spectrum may be attributed to modal interference between the lower-order symmetric and anti-symmetric supermodes of coupling, which has also been observed with commercial fiber optic couplers.

Figure 3B:
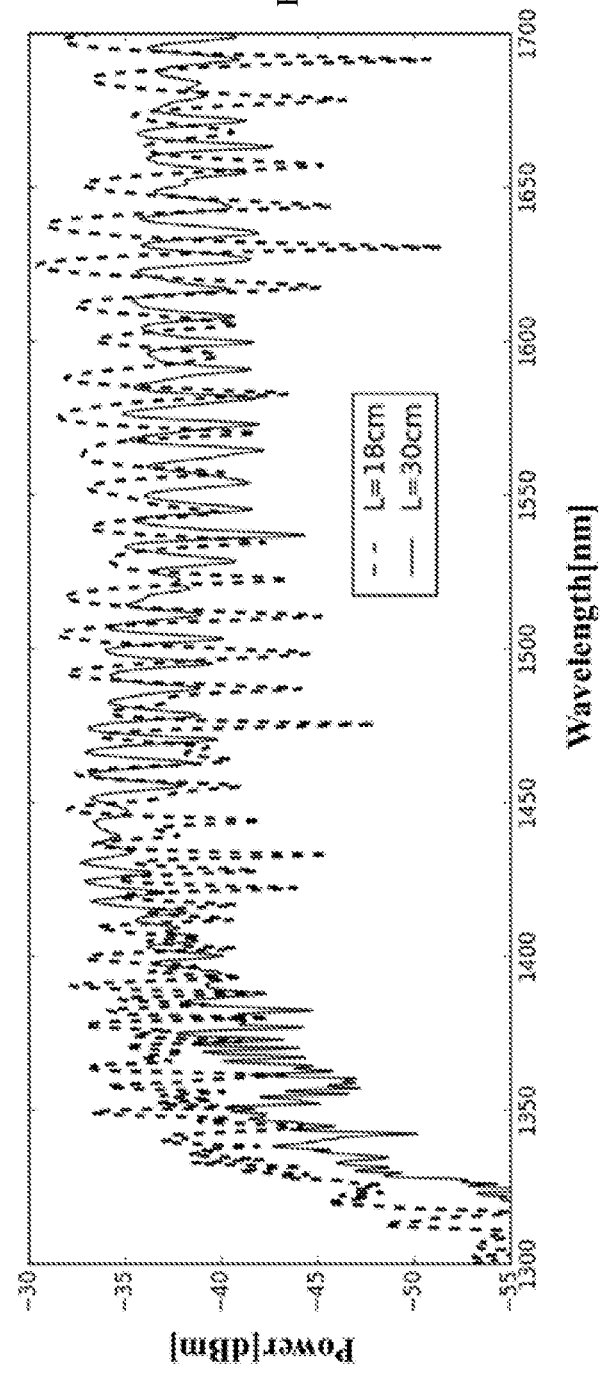
FIG. 3B shows a plot of transmission spectra collected from an output port of a dual core anti-resonant fiber (DCAF) at different fiber lengths.

FIG. 3B shows a plot of transmission spectra collected from port D (see FIG. 2C, 220d) at different fiber lengths, L, of about 18 cm and about 30 cm, with light being coupled into port A (see FIG. 2C, 220a). Both the period and strength of the sinusoidal modulation in the transmission spectrum increase as the coupler length gets shorter, as shown in FIG. 3B, which follows the regular of modes interference (manifesting itself as supermode interference). The regular oscillation pattern from about 1450 nm to about 1700 nm indicates that the fundamental mode may be dominant in the DHAF. In the wavelengths from about 1320 nm to about 1450 nm close to the resonant wavelength region, the irregular oscillation indicates multimode transmission.

Another parameter is the value of g/D, where g is the (air) gap width and D is the averaged core diameter. This value may determine the coupling length, $L_C$. In a fiber coupler (or fiber splitter) or a dual-core fiber, the coupling ratio (or splitting ratio) between cores may vary sinusoidally as the fiber length varies, meaning that energy may be transferred between the cores in a sinusoidal form along the fiber. The coupling length, $L_C$, refers to the shortest distance (or length) at which input (optical) power may be totally transferred from one core to another (neighbouring) core. Therefore, it may be helpful to explore the relationship between g/D and $L_C$ to determine the coupling length from the coupler geometry, so as to determine the fiber length for certain applications.

The coupling length, $L_C$, may be defined as $\lambda/(2\Delta n)$, where $\Delta n$ is the effective refractive index difference between the first order symmetric and antisymmetric modes. In the DHAF (or DCAF) structure of various embodiments, the coupling length, $L_C$, may be controlled by the design parameters, g and D. A simulation software using finite element analysis (e.g., Comsol Multiphysics) may be used to calculate $\Delta n$.

Figure 3C:
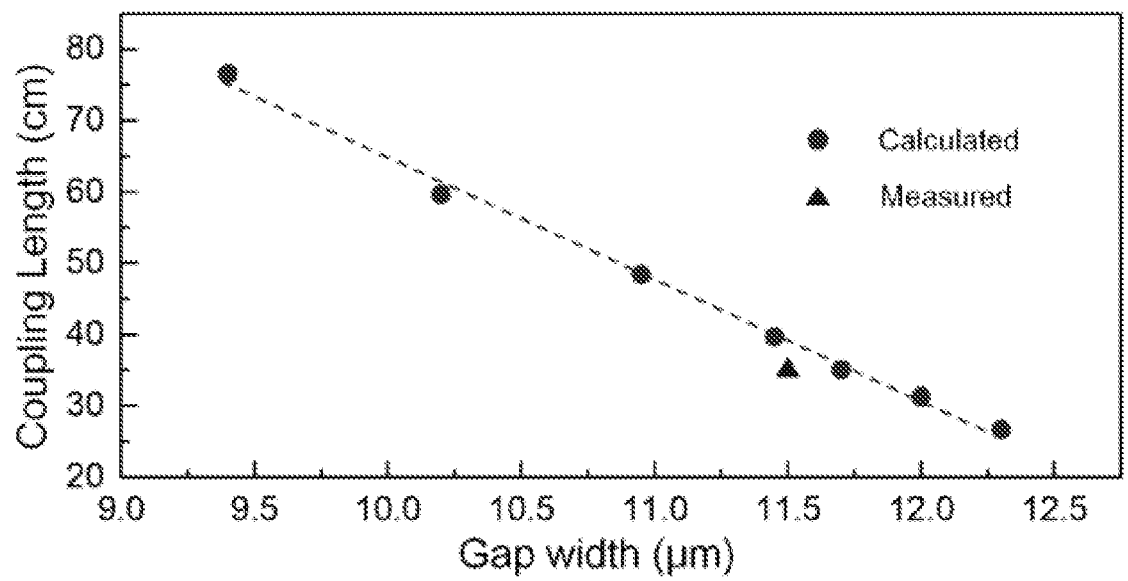
FIG. 3C shows a plot illustrating the relationship between the air gap width (g) and the coupling length ($L_C$) for a constant core diameter (D).

The calculated $L_C$ is shown in FIG. 3C, showing a linear dependence of the $L_C$ on the air gap width, g, when the core diameter, D, is kept invariant at 35 cm, and $\lambda$=1060 nm. A similar linear dependence may be observed when $L_C$ is plotted against g/D. As may be observed, the coupling length of a DHAF of various embodiments may decrease linearly (as illustratively traced by the dashed line) as the air gap width gets wider (or as as g/D becomes larger), thereby allowing design flexibility to meet fiber length requirement in the apparatus or system for various applications. As may also be observed, the measurement result (please see the triangular data point in FIG. 3C) is consistent with the calculation result.

Figure 3D:
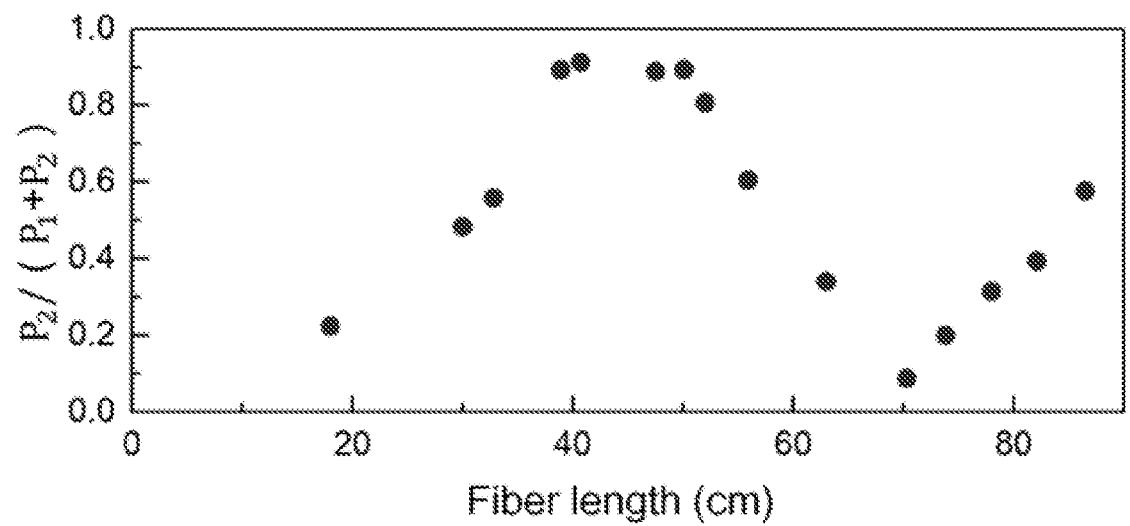
FIG. 3D shows a plot illustrating the evolution of measured coupling ratio along a dual hollow-core anti-resonant fiber (DHAF) length.

FIG. 3D shows a plot illustrating the evolution of measured coupling ratio along DHAF length for a DHAF having a gap width g=11.5 µm and a core diameter D=35 cm, and $\lambda$=1060 nm. The coupling ratio was measured under tension. For g=11.5 µm, the Lc is measured to be about 35 cm (please see FIG. 3C) from the evolution of the coupling ratio along the length of the DHAF, where the coupling ratio may be measured following $P_2/(P_1+P_2)$, with $P_1$ and $P_2$ being the output powers from core 1 (e.g., 202, FIGS. 2A, 2C) and core 2 (e.g., 203, FIGS. 2A, 2C), respectively, when input power, P, is launched into core 1. Subsequently, excess loss may be determined by $-10 \log[(P_1+P_2)/P]$. The theoretical result is well matched with a measured value within 8% discrepancy, as may be observed in FIG. 3C.

Hence, the Lc dependence on the design parameters offers a further degree of freedom in determining a coupling strength in addition to the coupler length as generally practiced in a fused fiber coupler.

In addition to the design parameter dependence, the coupling strength of the DHAF is also variable by applying a longitudinal tension even at a fixed design and length. In other words, the power transfer ratio (or coupling ratio) is not only controllable by the fiber length, but also by applying a longitudinal tension. The variable coupling ratio may be demonstrated as shows in FIGS. 4A and 4B.

Figure 4A:
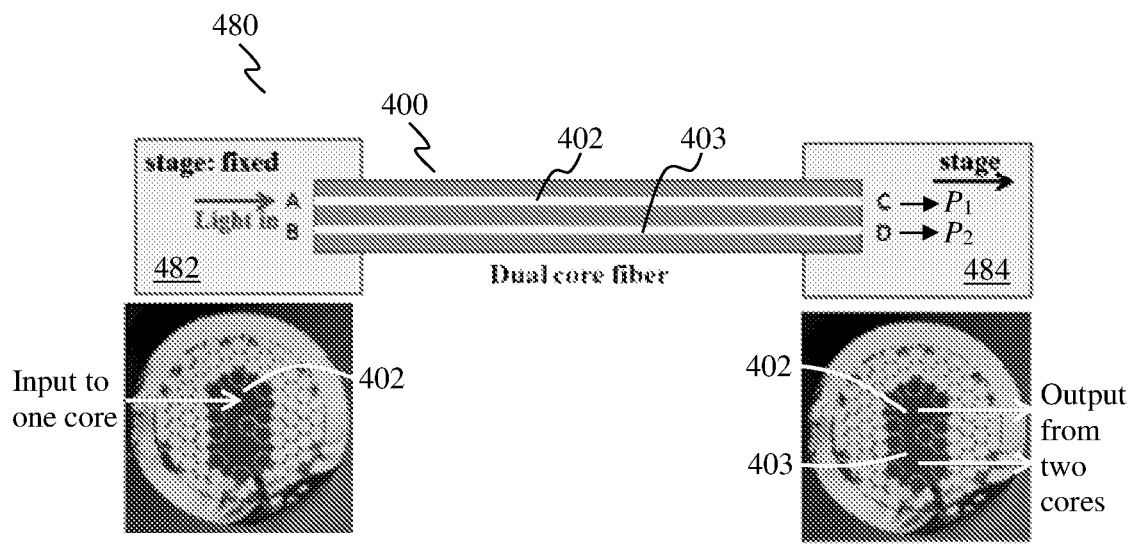

FIG. 4A shows a schematic view of a setup 480 for varying a light coupling ratio in a dual core anti-resonant fiber (DCAF) 400, by applying a longitudinal tension on the DCAF 400. The DCAF 400 has a structure as shown in FIG. 2B. Light is coupled into one core 402 via port A and output lights are collected from core 402 (core 1), and core 403 (core 2) via port C and port D respectively. The DCAF (or fiber coupler) 400 may be mounted on translational stages 482, 484 as illustrated in FIG. 4A. To evaluate the variable coupling ratio and its excess loss, the DHAF 400 may be placed in a straight way between the two translation stages 482, 484. The length of the DCAF 400 is chosen to be about 40 cm, which is at least substantially matched to (or close to) Lc as indicated in FIGS. 3C and 3D. Incident light at about 1.06 µm wavelength is launched into core 402 via port A, and output lights from both cores 402, 403 are monitored with a charged coupled device (CCD) camera to evaluate the coupling performance. The tension applied on the fiber 400 may be represented by the longitudinal travelling distance of the translation stage. As a non-limiting example, the stage 484 may be moved.

Figure 4B:
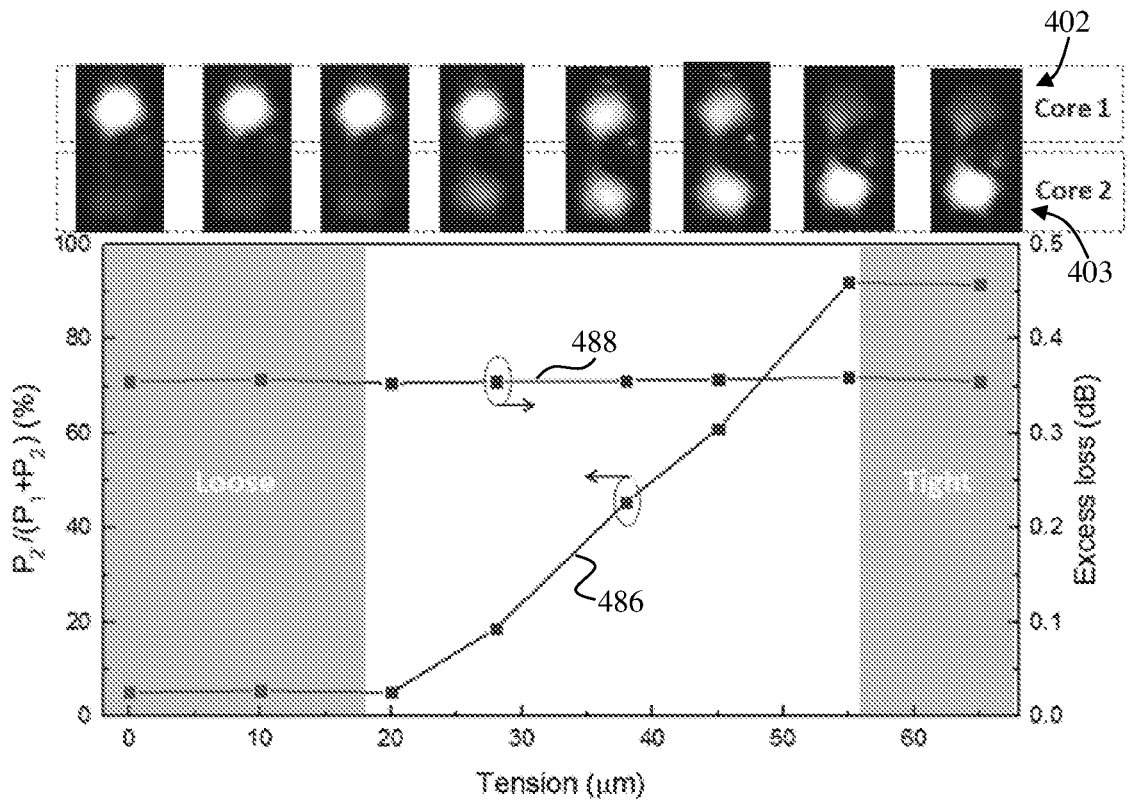
FIG. 4B shows a plot illustrating the relationships of coupling ratio and excess loss with external tension.

FIG. 4B shows a plot illustrating the relationships of coupling ratio and excess loss with external tension. The relationship between the output power $P_1$ from core 402 (or port C) and the output power $P_2$ from core 403 (or port D) and the longitudinal tension applied to the DCAF 400 may be observed. The result 486 obtained show a linear variation of the coupling ratio, $P_2/(P_1+P_2)$, with the applied external tension. When no additional tension is applied, and also at low tension, the coupling ratio is small at around 5% despite the fiber length being at least substantially matched to Lc, and the coupling ratio gradually increases with higher tension (fiber gets tighter and tighter). The ratio linearly increases from about 5% to about 95% by stretching the fiber 400 by about 40 µm, and linearly returns to the initial coupling ratio when the tension is released. The linear variable coupling strength is repeatable. The variability of the coupling ratio of the DCAF 400 is in contrast to known fiber couplers that have to be cut for a desired coupling ratio, thus invariant once its length is fixed. As such, the fibers of various embodiments may offer a variable coupling ratio using a single fiber length. Further, the variable coupling does not compromise the fiber performance in that the fiber insertion loss or total output power, $P_1+P_2$, is not sacrificed over the entire coupling ratio. The total output power is observed to be about at least substantially constant at about 6.5 mW.

The near field mode images showing the energy distribution in cores 402, 403 (or from the corresponding output ports) under different tensions are also presented in FIG. 4B, evidencing the variable coupling ratio. Further, the variable coupling does not deteriorate the fiber excess loss, as shown in result 488 in FIG. 4B. The excess loss is consistently measured at about 0.35 dB over the entire coupling ratio. Nevertheless, excess loss for the optical fiber of various embodiments may be in the range of 0.10-1.00 dB at the operating windows.

Figure 4C:
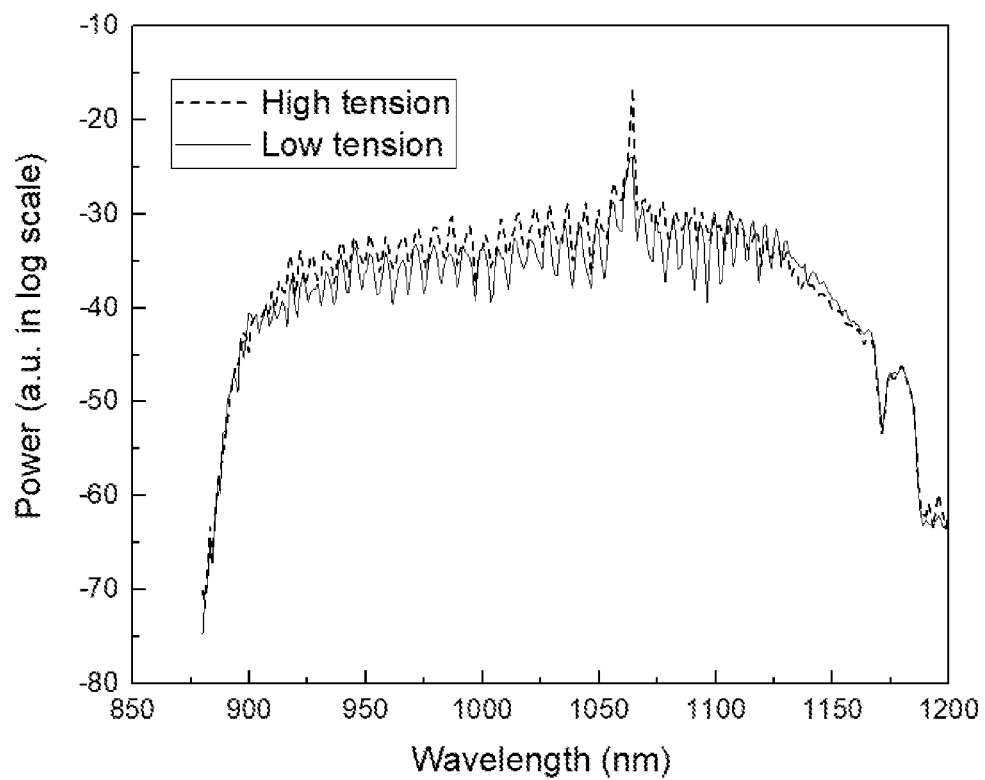
FIG. 4C shows a plot of transmission spectra at different longitudinal tensions applied on the fiber of various embodiments.

Further, it is noted that the transmission anti-resonant bands remain at least substantially intact under different tensions. FIG. 4C shows a plot of transmission spectra at different longitudinal tensions applied on the fiber of various embodiments, illustrating the variable coupling ratio of the DCAF 400 with application of different longitudinal tensions on the fiber 400. The transmission spectra are from core 403 of the DCAF 400 with the input light launched into core 402.

Without wishing to be bound by any theory, the dependence of the coupling ratio on the longitudinal tension may be related to the phase sensitivity of the fundamental mode to strain. Longitudinal strain may induce structural deformation of the hollow core fiber, resulting in fundamental mode effective index change. Moreover, in the DHAF (or DCAF) of various embodiments, the strain induced structural deformation may change the gap width, g, which may influence the coupling length as illustrated in FIG. 3C.

The coupling performance may also be determined with respect to polarization dependence. An input light at about 980 nm may be linearly polarized via a linear polarizer placed in front of the DCAF (or coupler) (e.g., 200, FIG. 2A). The polarized beam may then be coupled into one core (e.g., 202, FIG. 2A) of the DCAF. The transmitted powers at both cores (e.g., 202, 203, FIG. 2A) of the DCAF may be measured with a power meter, denoted as $P_1$ and $P_2$, respectively. As summarized in Table 1 below, the coupling ratio, $P_2/(P_1+P_2)$, is at least substantially maintained while rotating the polarization of the input light, which demonstrates the polarization independent performance of the DCAF. The variant power readings of $P_1$ and $P_2$ account for the original polarization of the input light. The input power attenuates when its polarization is not aligned to the linear polarizer. The property of polarization independence may minimise or eliminate the tedious process of input beam polarization alignment to a fiber polarization axis, hence making the DCAF's applications broader.

TABLE 1

Polarization and Coupling Ratio

| Δθ | 0° | 30° | 60° | 90° | 120° | 150° |
|---|---|---|---|---|---|---|
| $P_1$ (mW) | 43 | 30 | 6.5 | — | 13.5 | 31 |
| $P_2$ (mW) | 26 | 19 | 4 | — | 8.5 | 19 |
| $P_2/(P_1 + P_2)$ | 0.38 | 0.39 | 0.38 | — | 0.39 | 0.38 |

Δθ = angle difference between the directions of the linear polarizer and the incident light polarization.

Δθ=angle difference between the directions of the linear polarizer and the incident light polarization.

Non-limiting example applications for the DHAF or DCAF of various embodiments will now be described below. The DHAF may, for example, be the optical fiber 200 (FIG. 2A), 200b (FIG. 2B), or 400 (FIG. 4A).

Figure 5A:
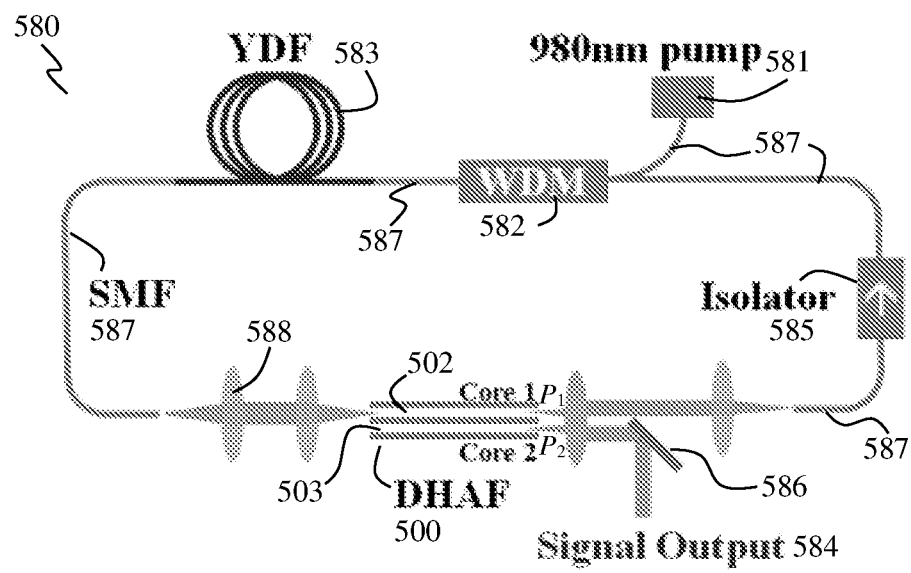
FIG. 5A shows a schematic view of a laser cavity, according to various embodiments.

A ytterbium doped fiber (YDF) laser ring cavity using the DHAF as a variable output coupler may be constructed. The setup configuration is shown in FIG. 5A. A 980 nm pump beam is coupled from a source 581 into the ring cavity 580 via a wavelength division multiplexing (WDM) coupler 582. Light may then be optically coupled to the YDF 583 and the signal light generated in the YDF 583 may be coupled out from the ring cavity 580, as signal output 584, via the DHAF 500. The signal light from the YDF 583 may be coupled into core 502 of the DHAF 500. A part of the light coupled into the DHAF 500 may be coupled out from core 503 as the output light 584, and from core 502 to continue propagating in the laser cavity 580, via an isolator 585 and the WDM coupler 582 back to the YDF 583. A reflective element 586 may be provided to redirect the output light 584. The ring cavity 580 may include one or more single mode fibers (SMF) 587 for light propagation, and optical lenses (represented as 588 for one lens) for collimating and/or focusing light.

The output coupling (OC) ratio ($r=P_2/(P_1+P_2)$) may be adjustable by applying a longitudinal strain on the DHAF 500. The variable OC ratio may enable the output power to be maximised without physically changing the output coupler 500.

Figure 5B:
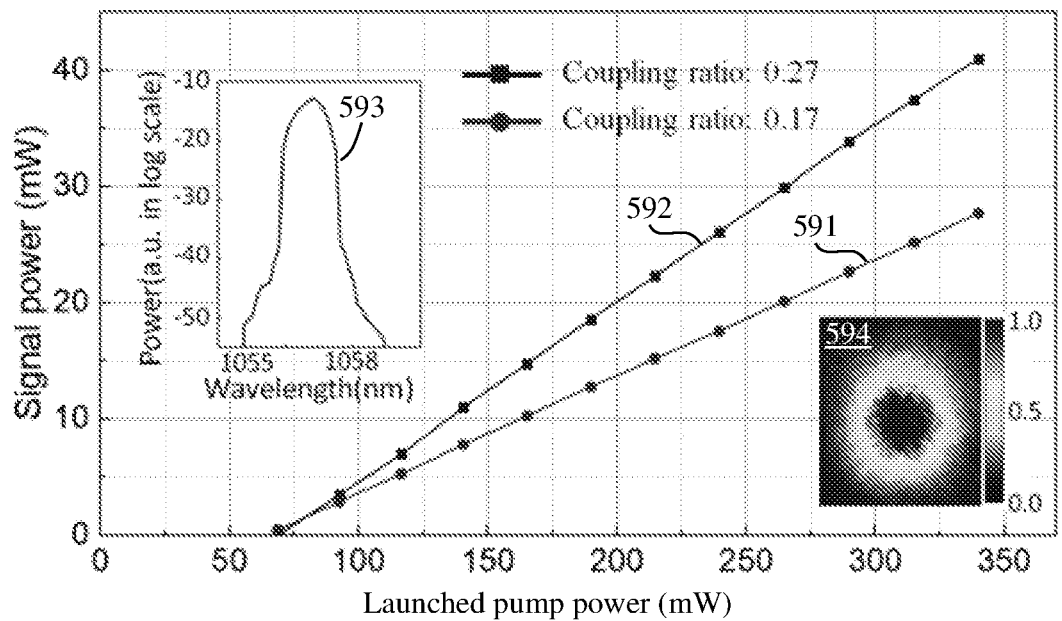
Figure 5C:
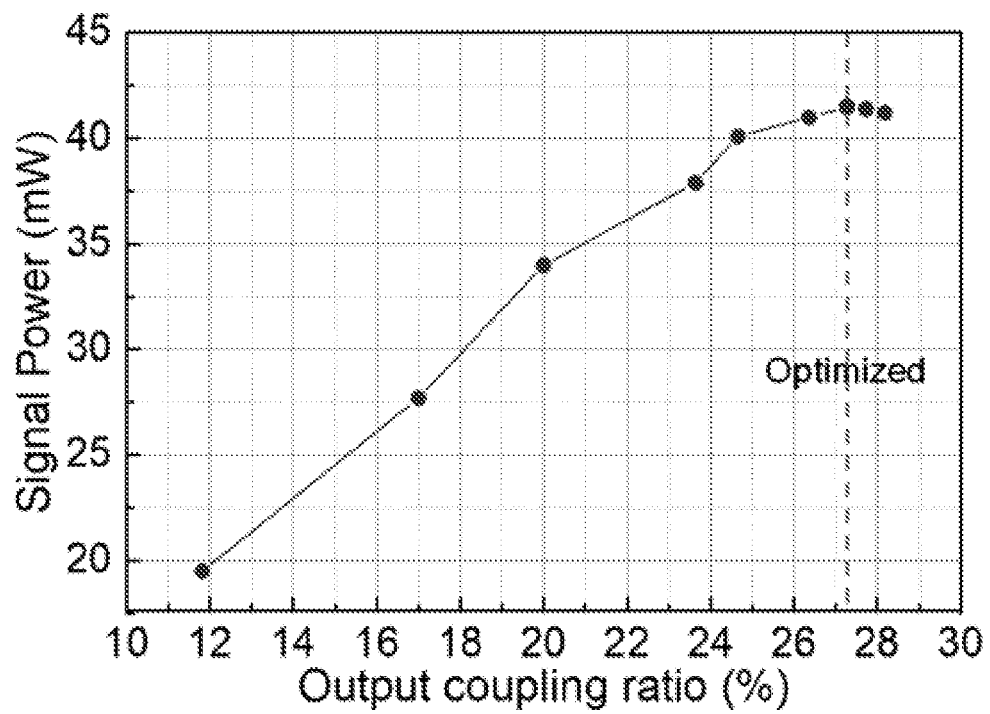
FIG. 5C shows a plot of measured output signal power at various output coupling ratios under maximum pump power for the laser cavity of FIG. 5A.

The cavity 580 was observed to successfully lase with the coupler 500. When the OC ratio is set at about 17%, (i.e., r=0.17), an output power of about 27 mW may be obtained at about 1057 nm, with a 10% slope efficiency (see result 591) as shown in FIG. 5B. The output power grows with increasing OC until it reaches maximum output power. FIG. 5C shows the result of using the variable output coupler 500 for cavity optimization. As may be observed, the output power may be maximized by adjusting the OC ratio. At 27% OC (i.e., r=0.27), the output power may reach a maximum of about 42 mW at about 1057 nm with 15.5% slope efficiency (see result 592) which is also shown in FIG. 5B.

The threshold power goes up with the OC ratio, from about 64 mW at 17% OC to about 68.5 mW at 27% OC. The output laser is observed to be a single mode Gaussian-like beam as shown by the captured output beam profile 594 in the inset of FIG. 5B. The output signal spectrum 593 is also shown as another inset at the maximum signal power at 27% output coupling ratio. The spectral width of the output signal is about 2 nm with a central wavelength at about 1057 nm. The signal-to-noise ratio is higher than 40 dB.

The rather low laser efficiency may be attributed to a high cavity loss resulting from the free space coupling optics (e.g., reflective element 586, lenses 588) as schematically shown in FIG. 5A. The cavity loss is estimated at about 4.6 dB excluding the output coupling. All-fiberized connection may reduce the coupling loss and broaden the applications of the DHAF of various embodiments. The successful demonstration of using the air core coupler of various embodiments in a fiber laser cavity suggests the feasibility of constructing an all-fiber mid-IR laser cavity using the air core coupler technology.

Another application of the air core fiber may be for ultrafast beam delivery. As the DHAF supports broadband transmission, a full spectrum coupling of ultrafast pulses may be expected. The ultrafast laser source is a mode-locked solid-state Yb:CaYALO$_4$ oscillator by using graphene as the saturable absorber. The femtosecond pulses have a spectral bandwidth of about 26 nm with central wavelength at about 1055 nm, with a pulse repetition frequency of about 113.5 MHz and a pulse duration of about 47 fs. The laser delivers a single pulse energy of about 2 nJ, and a pulse peak power of about 43 kW. The laser pulse may be coupled into the fiber under test (FUT) (i.e., DCAF) via a plane-convex lens with a 30 mm focal length. The transmitted beam pulse from the fiber output end may then be collimated by another plane-convex lens with a 8 mm focal length, and subsequently directed to an auto correlator for pulse width measurement.

Figure 6A:
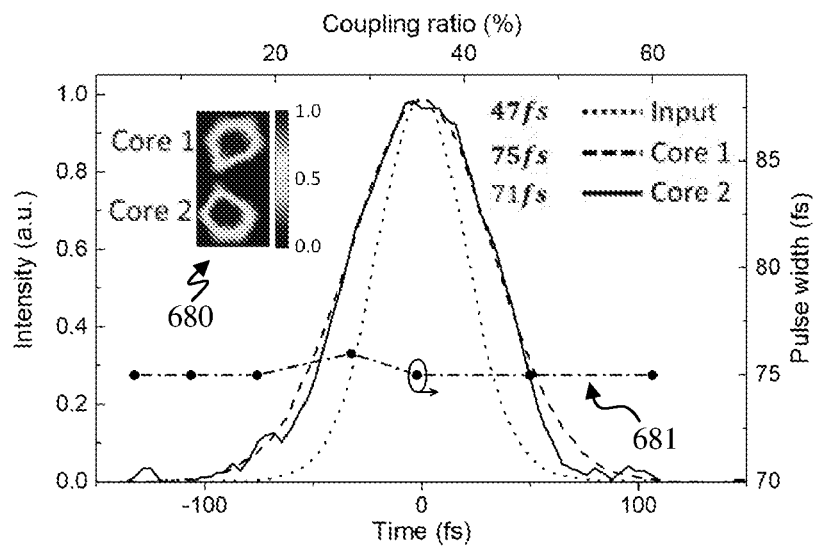
FIG. 6A shows a plot of results for an input pulse and output pulses from an air core coupler of various embodiments for ultrafast beam delivery.

As shown in FIG. 6A, when a 47 fs pulse is coupled into a first core (e.g., Core 1) of a 40 cm DHAF set at a 3 dB coupling ratio, the output pulse widths from first and second cores (e.g., Core 1 and Core 2) are measured at about 75 fs and about 71 fs respectively, which are almost the same. The near field mode image 680 illustrating the mode profiles of the two cores are shown in the inset of FIG. 6A, showing single mode transmission and the 3 dB coupling. The coupling ratio may be changed in a range of 5-60% as shown in the upper x-axis in FIG. 6A, and the output pulse width from the first core is shown over the different coupling ratios as result 681. There is substantially minimal or no change in the pulse width, confirming robust and uncompromised operation of the fiber coupler for ultrafast laser power splitting and delivery.

Figure 6B:
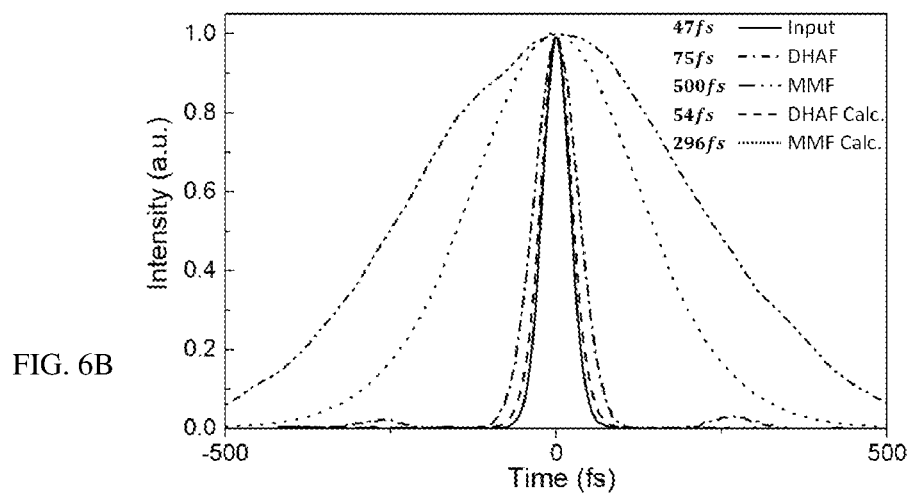
FIG. 6B shows a plot of results for output pulses from an air core coupler of various embodiments and a commercial multimode fiber (MMF).

The air core delivery results are compared to a commercial 62.5 μm solid core multimode fiber (MMF). A same length of the MMF piece is prepared for the transmission test. As shown in FIG. 6B, the 47 fs input pulse experiences rapid broadening when propagating through the 40 cm MMF. The pulse broadens to about 500 fs. The theoretical values, calculated from dispersion length, $L_D$, and nonlinear length, $L_{NL}$, also indicate much broader pulse width by the MMF, as will be further discussed below. The calculated pulse widths are plotted in dashed curves in FIG. 6B. It may be observed that the actual broadening is larger than the theoretical expectation for both the DHAF and MMF. For the DHAF of various embodiments, the measured broadening factor is about 1.60 which is a bit greater than the calculated value of about 1.15. This discrepancy may be caused by the overlap between propagating pulse and silica wall, which is not taken into consideration in the calculation. As the nonlinear index of silica is four orders of magnitude higher than that of air, even a 0.5% percentage light overlap with the silica may significantly enhance the nonlinear effects. For the MMF, the discrepancy may be attributed to the error between actual and estimated values of simulation parameters including effective mode area, nonlinearity index, and dispersion factor (since modal dispersion is not considered in the simulation/calculation). Details of the calculation parameters are described further below.

The calculation of the broadened pulse as shown in FIG. 6B will now be described. Pulse broadening is mainly induced by group velocity dispersion (GVD) and nonlinear effects. The dispersion length $L_D$ and the nonlinear length $L_{NL}$ indicate contributions of the dispersive or nonlinear effects to pulse broadening. $L_D$ and $L_{NL}$ may be defined as:

$$L_D = \frac{T_0^2}{|\beta_2|}, \quad \text{Equation (1)}$$

$$L_{NL} = \frac{1}{\gamma P_0}, \quad \text{Equation (2)}$$

where $T_0$ is the full width at half maximum (FWHM) of an incident pulse, $\beta_2$ represents dispersion of the group velocity and is responsible for pulse broadening, $P_0$ is peak power of the incident pulse, and $\gamma$ is the nonlinear coefficient and may be determined by the following:

$$\gamma = \frac{2\pi n_2}{\lambda A_{eff}}, \quad \text{Equation (3)}$$

where $n_2$ is the nonlinear index of the fiber core material, $A_{eff}$ is the effective mode area, and $\lambda$ is the central wavelength of the pulse.

As a non-limiting example, $P_0$=43 kW, $T_0$=47 fs, $\lambda$=1055 nm, and the results in Table 2 may be obtained according to Equations (1), (2) and (3).

TABLE 2

| | Dispersion and Nonlinear Length Calculation | | | | |
|---|---|---|---|---|---|
| | $n_2$ | $A_{eff}$ | $|\beta_2|$ | $L_{NL}$ | $L_D$ |
| | | | Unit | | |
| Fiber Type | $10^{-20}$ cm²/W | μm² | ps²/km | m | m |
| MMF | 2.8 × $10^{-4}$ | 655 | 4 | 0.087 | 0.095 |
| DCAF | 8.0 | 210 | 0.38 | 97.0 | 1.262 |

Figure 6C:
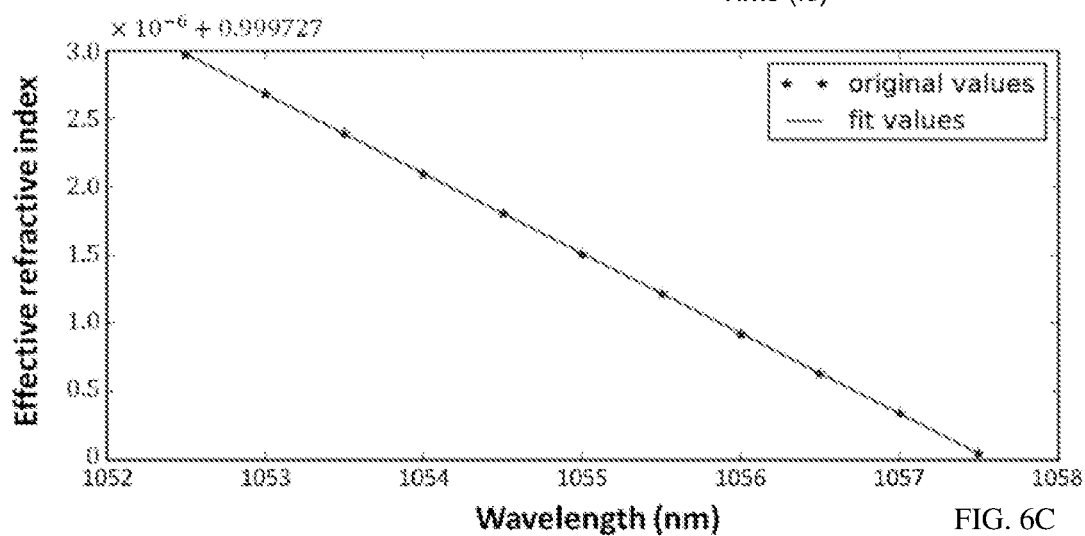
FIG. 6C shows a plot of simulated and fitted values of the effective index of the DHAF of various embodiments.

The effective mode areas ($A_{eff}$) in Table 2 are the simulated values by using Polymode assuming that the beam is guided in the fundamental mode. The effective refractive index at 1055 nm of the DHAF is also calculated and fitted into the following equation, with the results shown in FIG. 6C:

$$n(\lambda) = -1.768 \times 10^{-12} \lambda^3 + 5.175 \times 10^{-19} \lambda^2 - 5.599 \times 10^{-6} \lambda + 1.002 \quad \text{Equation (4).}$$

$\beta_2$ of the DHAF may then be calculated according to the equation below:

$$\beta_2 = \frac{\lambda^3}{2\pi c^2} \frac{d^2 n}{d\lambda^2}, \quad \text{Equations (5)}$$

where c is light velocity in vacuum, n is refractive index and $\lambda$ is wavelength.

In both the DHAF and MMF cases, the fiber length L is set at 0.4 m. The code provided in Appendix B in "G. P. Agrawal, Nonlinear fiber optics (Academic, Boston, 2007)" based on split-step method is used to simulate the pulse evolution. For MMF, since $L_D$<L, $L_{NL}$<L, dispersion and nonlinearity act together as the pulse propagates along the fiber. For DHAF, since $L_D$>L, $L_{NL}$>>L, neither dispersive nor nonlinear effects play an important role in pulse propagation, and the pulse may not suffer notable degradation.

The optical fiber (coupler) of various embodiments may also be applicable for ultrafast laser spectroscopy. Due to the nature of a fiber coupler, an incident beam into one of the air cores may be coupled to the other core partially or completely, depending on the coupler design. When the coupler is set for a partial coupling, the incident beam may be split into two beams which may be mutually coherent (see, for example, FIGS. 4A and 4B). The ability of creating two coherent beams is important for various applications including an ultrafast laser spectroscopy. The spectroscopy uses a femtosecond laser pulse to achieve high resolution in a time domain. Involvement of the femtosecond laser requires lots of free space optics in known systems to direct and split the laser beam. Known solid core fibers cannot accommodate the femtosecond pulses due to strong pulse distortion processes. The free space optical relay lines are delicate, and cause tedious labour works to align before operation. However, the use of the multiple core optical fiber of various embodiments may simplify the system. One or more or all the optical delivery lines employed in known spectroscopy systems may be replaced by the air core fibers and air core couplers of various embodiments, minimising or getting rid of the tedious aligning works, thereby making the system compact, robust and easy to operate, with lower cost of ownership.

Additional non-limiting examples of applications will now be described. Various embodiments may open up a new horizon to expand the legacy of fiber technology to the scarcely exploited mid-IR or deep UV region where known fiber couplers cannot reach. All fiberized mid-IR fiber laser is one example. Known gas filled fiber lasers at mid-IR have to employ free-space optical elements to form a laser cavity simply because of the absence of fiber couplers. Free-space optics implies bulky, intricate, and expensive system, with optical power losses at every interface between the free space optics and the fiber optics. The air core fiber (coupler) of various embodiments may be employed to construct all fiberized compact robust fiber resonator or cavity as shown in FIG. 7, which may be used for near IR fiber lasers.

Figure 7:
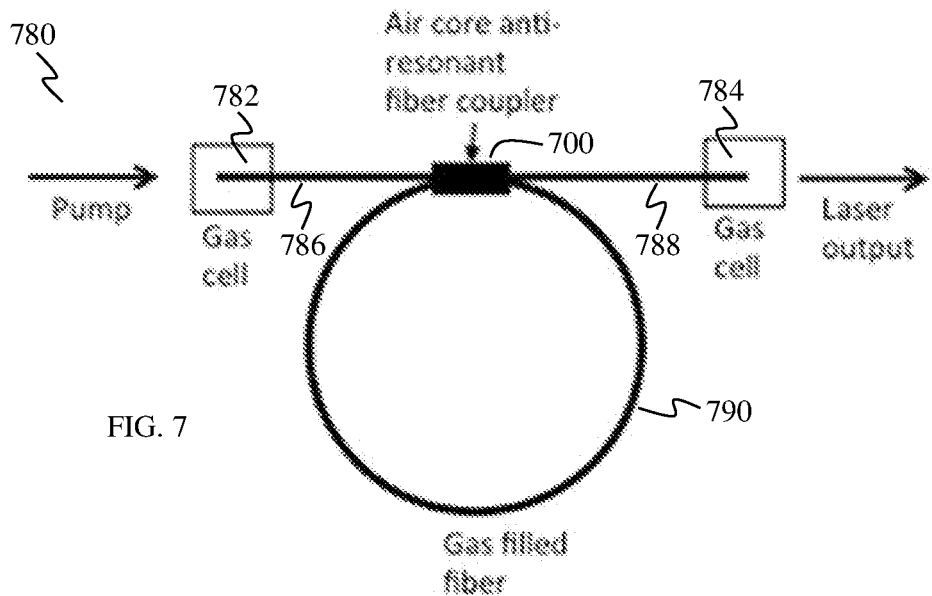
FIG. 7 shows a schematic view of an all-fiber ring cavity constructed by the optical fiber of various embodiments.

FIG. 7 shows a laser cavity 780 having an air core anti-resonant fiber coupler (e.g., DHAF) 700. The laser cavity 780 may include a gas cell 782 optically coupled, via an optical fiber 786, to the fiber coupler 700. The gas cell 782 may receive a pump signal. The laser cavity 780 may further include a gas cell 784 optically coupled, via an optical fiber 788, to the fiber coupler 700. A laser output may be provided from the gas cell 784. The laser cavity 780 may further include a gas filled fiber 790 in the form of a ring optically coupled to the fiber coupler 700. The gas in the gas cells 782, 784 and in the fiber 790 may act as the gain medium. As a non-limiting example, the gas may be acetylene which may have an efficient mid-infrared emission when pumped with 1530 nm light.

Another application includes signal interleaving at time-division multiplexing (TDM) and/or wavelength-division multiplexing (WDM) optical fiber communication networks. The advent of low loss air core fibers promises a low latency network surpassing today's solid core fiber network. Deploying air core fibers in real applications requires matched air core fiber components to serve as a multiplexer (MUX) and a de-multiplexer (DEMUX) in the network. Otherwise, joints between the solid core fibers and the air core fibers inevitably induce parasitic back-reflection and high connection loss.

Figure 8:
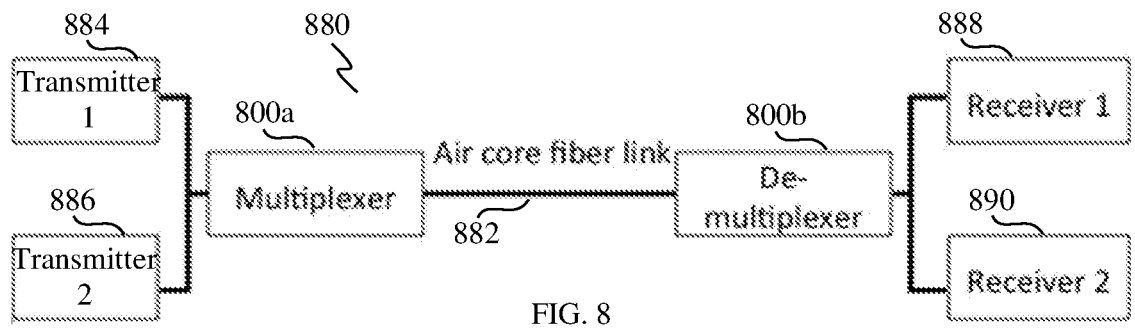
FIG. 8 shows a schematic view of an air core fiber network.

FIG. 8 shows a schematic view of an air core fiber network 880 for low latency communication that may mitigate the problems mentioned above. The network 880 may include a first air core fiber coupler 800*a* and a second air core fiber coupler 800*b*, of the type of multiple air core couplers of various embodiments. The first air core fiber coupler (e.g., DHAF) 800*a* and the second air core fiber coupler (e.g., DHAF) 800*b* may be optically coupled to each other via an air core fiber link 882 having a single air core. The fiber coupler 800*a* may serve as a multiplexing element or multiplexer (MUX) while the fiber coupler 800*b* may serve as a demultiplexing element or demultiplexer (DE-MUX). As such, the multi-air core fiber coupler of various embodiments may serve as a multiplexer and a demultiplexer. The fiber coupler 800*a* may be optically coupled to a plurality of (optical) transmitters, e.g., first and second transmitters 884, 886. The fiber coupler 800*b* may be optically coupled to a plurality of (optical) receivers, e.g., first and second receivers 888, 890.

The multiplexing/demultiplexing elements, i.e., the fiber couplers 800*a*, 800*b*, may have different coupling ratios for different wavelengths. As a non-limiting example, in an application where the fiber coupler 800*b* acts as a demultiplexer, there may be two signals in the air core fiber link 882, e.g., where one signal may be modulated in a 600 nm light and another signal may be modulated in a 1500 nm light. Both signals may be launched into a first core of the fiber coupler (DEMUX) 800*b*, and as the coupling lengths of 600 nm and 1500 nm lights are different, and with proper design of the fiber coupler 800*b*, about 100% power of the 600 nm light may be outputted from the first core (e.g., to Receiver 1 888) and 100% power of the 1500 nm may be outputted from a second core (e.g., to Receiver 2 890). In this way, two signals may be demultiplexed.

The fiber coupler (MUX) 800*a* may be equivalent to a beam combiner. The fiber coupler (DEMUX) 800*b* may, but not necessarily, be equivalent to a beam splitter. Nevertheless, the fiber coupler (DEMUX) 800*b* may have wavelength sensitive splitting characteristic or performance.

The fiber coupler (MUX) 800*a* and the fiber coupler (DEMUX) 800*b* may be fully fiberized when the multiple air cores of the fiber couplers 800*a*, 800*b* are connected to single core fibers separately.

Moreover, the fiber coupler of various embodiments may be used to construct fiber resonators and fiber interferometers for applications in sensors and bio-images. Also, the fiber coupler may be used for ultrafast laser power splitter with minimal or without suffering from pulse broadening or damage.

Figure 9:
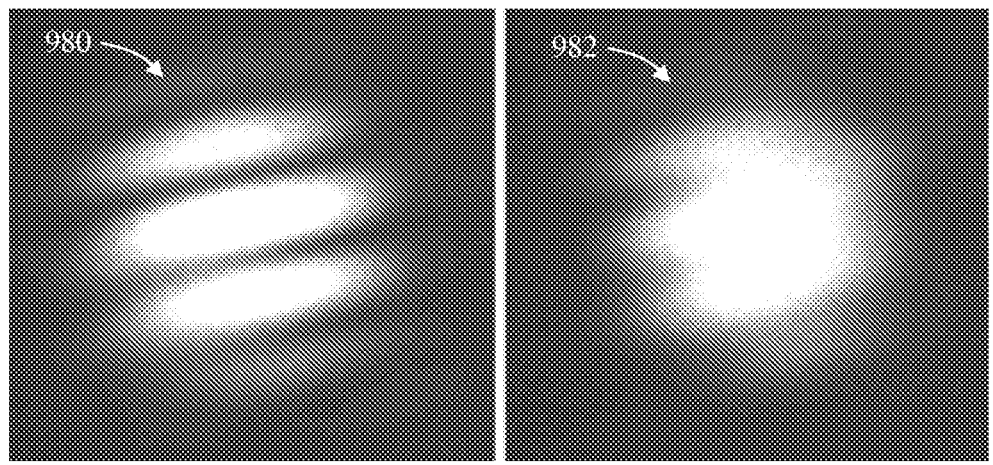
FIG. 9 shows interference patterns generated by the fiber coupler of various embodiments.

Further, the multiple core fiber of various embodiments may be used to build an (all-fiber) interferometer, for example, by using a two-core structure for the fiber. FIG. 9 shows interference patterns generated by the fiber coupler (e.g., DHAF) of various embodiments, captured in the far-field. When the two cores carry comparable powers, a strong interference pattern (with high contrast) 980 may be generated. On the contrary, a weak or low contrast interference pattern 982 is generated when powers at both cores are unmatched, e.g., when one core carries much more significant power than the other core. Therefore, the DHAF design of various embodiments may allow a simple straightforward way to create a fiber based interferometer, which may be applicable to sensors, quantum photonics devices, and optical coherence tomography.

Various embodiments may provide a beam combiner using the multi-hollow core fiber as described herein. Apart from the application of beam splitting of the air core coupler as described herein, the multiple air core fiber of various embodiments may also be useful for beam combining, for example, for mid-IR and ultrafast lasers, which is currently done using free space optics, thus suffering the aforementioned drawbacks. In contrast, beam combining of mid-IR and femtosecond laser may be achievable in a straightforward way, with the multiple air core fibers.

Figure 10:
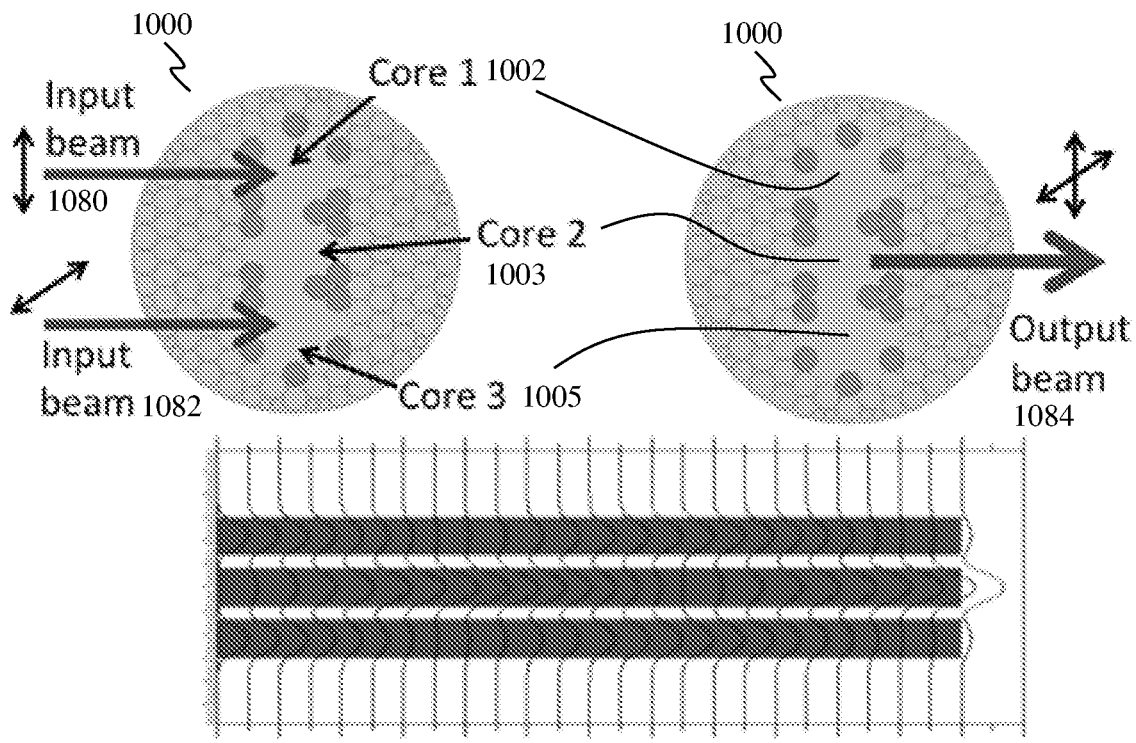
FIG. 10 shows beam combining using the optical fiber of various embodiments.

In various embodiments, a beam combiner may be provided, including the multi-hollow core fiber having at least three hollow cores. FIG. 10 shows beam combining using the optical fiber of various embodiments, illustrating beam combination in a triple air core fiber 1000. Two incident or input beams 1080, 1082 at orthogonal polarisation states (illustrated by the double-headed arrows) enter or are coupled into the air cores of the coupler 1000, for example, core 1002 (Core 1) and core 1005 (Core 3). The two beams 1080, 1082 into the cores 1002, 1005 may then be combined in the core 1003 (Core 2), providing an efficient power scaling method. While propagating, the two beams 1080, 1082 in the cores 1002, 1005 respectively may be coupled to core 1003, thereby being added up to a higher output power in and from the core 1003. The output power is nearly the sum of the powers in the cores 1002, 1005. The light beam 1080 in the core 1002 and the light beam 1082 in the core 1005 may be coupled into and out of the core 1003 in a sinusoidal pattern. The triple hollow core fiber 1000 may be cut to a length when the maximum intensity is built at the core 1003. The air core air gap combining effect of the fiber 1000 may enable power scaling of mid-IR and ultrafast laser coherently as well as incoherently. It should be appreciated that the number of cores for beam combiners may be scalable and the optical fiber acting as a beam combiner may have more than three cores to combine more lights or laser beams.

Figure 11:
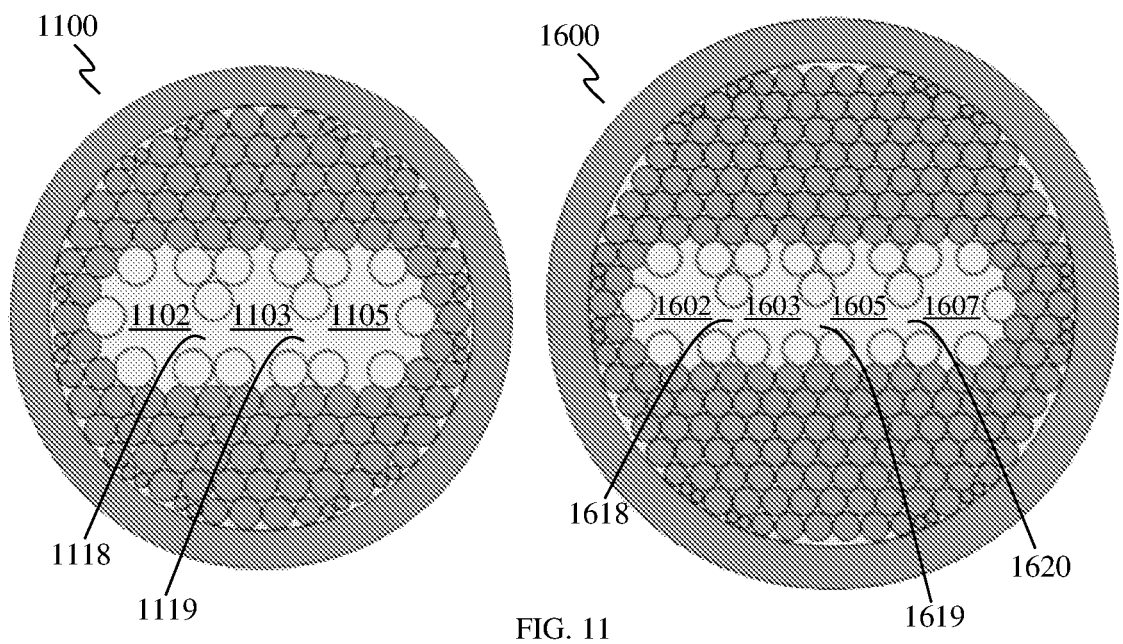
FIG. 11 shows schematic cross-sectional views of three-air core and four-air core optical fibers, according to various embodiments.

The number of cores of the optical fiber of various embodiments may be higher than two. As a non-limiting example, FIG. 11 shows schematic cross-sectional views of three-air core and four-air core optical fibers (or couplers) to illustrate scalability of the number of cores. The optical fiber 1100 may include three cores 1102, 1103, 1105, with an air gap 1118 bridging the adjacent cores 1102, 1103, and an air gap 1119 bridging the adjacent cores 1103, 1105. The optical fiber 1600 may include four cores 1602, 1603, 1605, 1607 with an air gap 1618 bridging the adjacent cores 1602, 1603, an air gap 1619 bridging the adjacent cores 1603, 1605, and an air gap 1620 bridging the adjacent cores 1605, 1607. The other parts of the fibers 1100, 1600, for example, the cladding regions, may be as described herein and is therefore omitted with respect to the fibers 1100, 1600.

Figure 12:
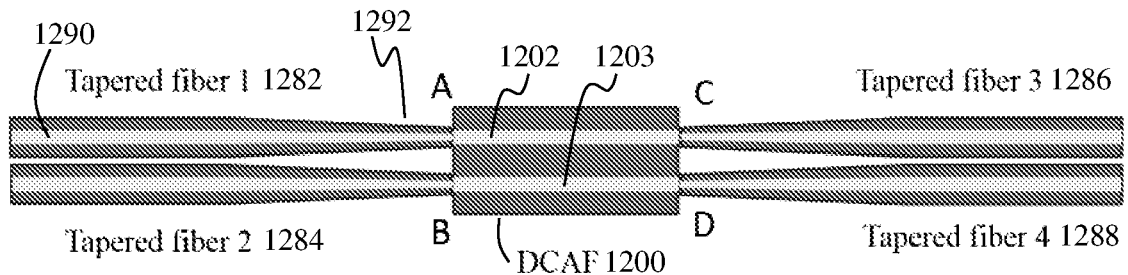
FIG. 12 shows a schematic view of connection of a dual core anti-resonant fiber (DCAF) of various embodiments with tapered fibers.

The optical fiber (coupler) of various embodiments may be connected directly to one or more other fibers or fiber components or via one or more fiber extensions. The extension may be achieved by splicing or butt-coupling the fiber coupler and the extension fibers to each other. FIGS. 12 and 13B show fiber connections to the coupler to provide direction connection to other fiber(s) or fiber component(s). The fiber coupler may be a multiple air core optical fiber, for example, a dual core anti-resonant fiber (DCAF) (e.g., 200, FIG. 2A; 400, FIG. 4A).

Referring first to FIG. 12, the DCAF 1200 may include two air cores 1202, 1203 providing 2×2 ports as input ends (Ports A and B) and output ends (Ports C and D). Each port may be accessible via free space or a connection fiber (or fiber extension) as shown in FIG. 12. In the air core fiber coupler 1200, the neighbouring two cores 1202, 1203 may be placed very closely in order to realise optical coupling, and there may, therefore, be challenges in using known uniform fibers as a connection fiber. Adaptation of the connection fiber is required, and fiber tapering is one non-limiting example of such adaptation. As shown in FIG. 12, four tapered fibers 1282, 1284, 1286, 1288, may be provided coupled to ports A, B, C, D respectively of the DCAF 1200. Using the tapered fiber 1282 as an example but may also be applicable to the other tapered fibers 1284, 1286, 1288, the tapered fiber 1282 may include a core 1290 and a tapered region (or end) 1292. The tapered end 1292 may be placed at one of the air cores (core 1202 as shown in FIG. 12) for coupling purpose. The cores 1202, 1290 may be at least substantially aligned to each other. Because of the smaller diameter of the tapered end 1292, two tapered fibers 1282 and 1284, and 1286 and 1288, may be placed side by side, at least substantially or exactly matched to the air core location. This may allow 2×2 connection in full. Therefore, air core coupling may be fully all-fiberized.

Figure 13A:
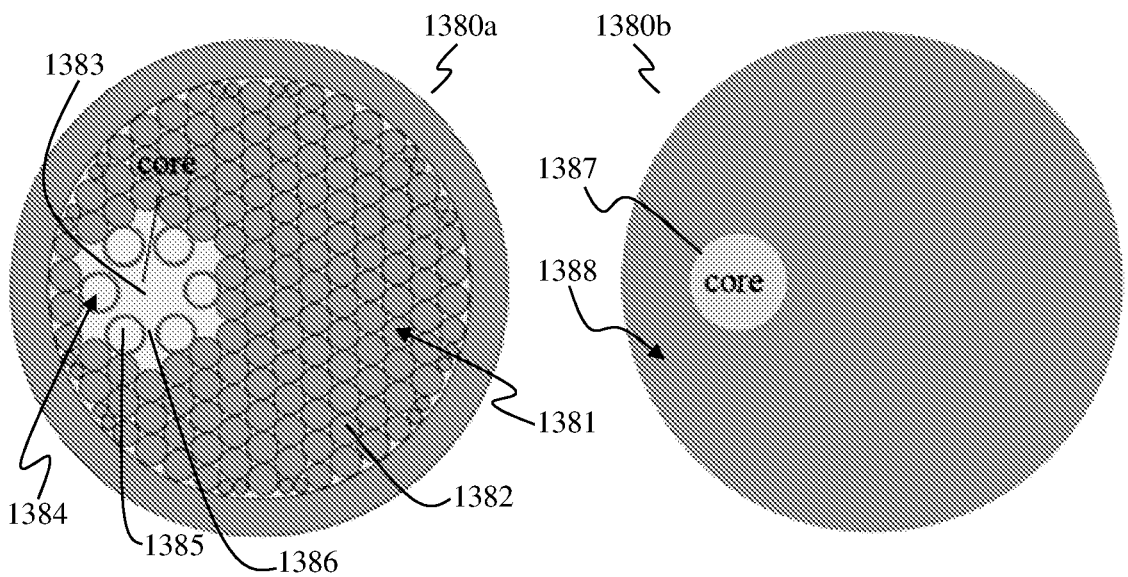
Figure 13B:
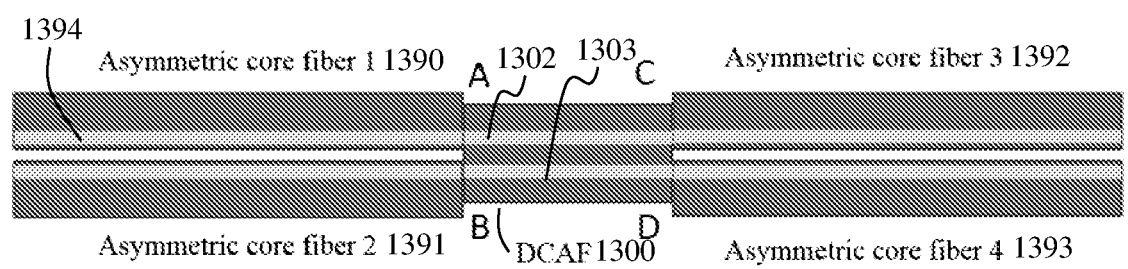
FIG. 13B shows a schematic view of connection of a dual core anti-resonant fiber (DCAF) of various embodiments with asymmetric core fibers.

Alternatively, an asymmetric core fiber, as shown in FIG. 13A, may be used as a connection or extension fiber for a coupler as shown in FIG. 13B. The asymmetric core fiber 1380a may include a first cladding region 1381 of a plurality of rods and/or capillaries 1382, a core 1383, and a second cladding region 1384 of a plurality of capillaries 1385 with a plurality of splits 1386 defined through the second cladding region 1384. The asymmetric core fiber 1380a may be an anti-resonant optical fiber. The asymmetric core fiber 1380b may include a core 1387 and a cladding region 1388. Each of the asymmetric core fibers 1380a, 1380b has an off-centered core 1383, 1387. Each of the asymmetric core fibers 1380a, 1380b may have a single core.

Referring to FIG. 13B, the DCAF 1300 may include two air cores 1302, 1303 providing 2×2 ports as input ends (Ports A and B) and output ends (Ports C and D). Each port may be accessible via free space or a connection fiber (or fiber extension) as shown in FIG. 13B. Four asymmetric core fibers 1390, 1391, 1392, 1393, may be provided coupled to ports A, B, C, D respectively of the DCAF 1300. Any one of the asymmetric core fibers 1390, 1391, 1392, 1393 may be one of the asymmetric core fibers 1380a, 1380b. Using the asymmetric core fiber 1390 as an example but may also be applicable to the other asymmetric core fibers 1391, 1392, 1393, the asymmetric core fiber 1390 includes an off-centered core 1394 that may be connected to one of the cores (core 1302 as shown in FIG. 13B) in the coupler 1300. The cores 1302, 1394 may be at least substantially aligned to each other. Because the wall thickness close to or on one side of the core 1394 is small, two of such asymmetric core fibers 1390 and 1391, and 1392 and 1393, may be placed side by side at least substantially matched to or at the exact location of the air cores 1302, 1303 in the coupler 1300. This may allow 2×2 connection in full. Therefore, air core coupling may be fully all-fiberized.

It should be appreciated that the number of fiber extensions employed may depend on the number of cores of the multi-core optical fiber. As a non-limiting example, two fiber extensions may be provided per core, at the input and output associated with the core.

The sensing application of dual hollow-core anti-resonant fibers (DHAFs) of various embodiments will now be described. A double hollow-core antiresonant fiber based modal interferometer may be employed for sensing applications. As a non-limiting example, a DHAF based gas pressure sensor with 40 nm/MPa ultrahigh sensitivity will be described.

Dual core fibers show instinctive modal interference between lower order supermodes which is favorable in sensing applications. Core modes of hollow core anti-resonant fiber (HAF) may propagate essentially in air and may be insensitive to temperature variations, while large air-filling fraction makes HAF extremely sensitive to mechanical forces, such as bend, strain and pressure. Taking advantage of dual core fibers and HAFs, DHAFs possess instinctive modal interference induced spectral oscillatory patterns that are high mechanical force sensitive but low temperature sensitive. As a result, DHAFs are of great potential in monitoring complex structures, e.g., in aerospace, marine, and civil engineering.

Figure 14A:
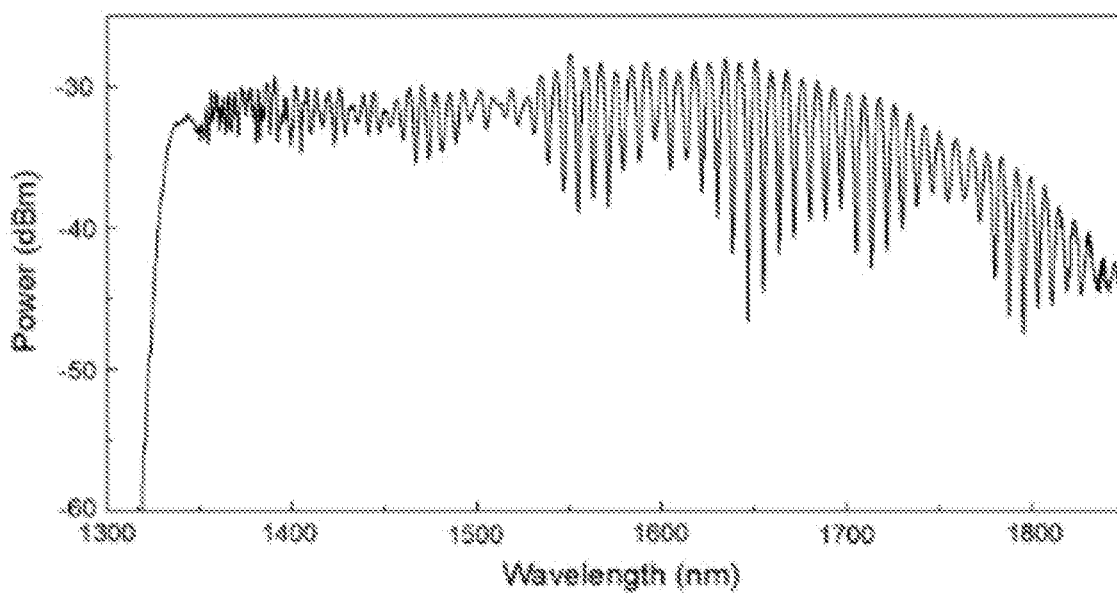
FIG. 14A shows a plot of transmission spectrum of a DHAF showing modal interference induced oscillatory pattern.
Figure 14B:
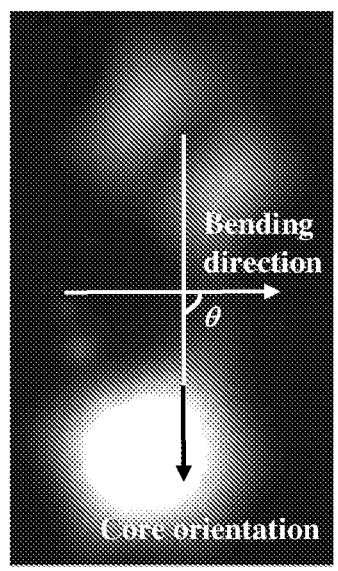
FIG. 14B shows an image for defining the bending direction and the core direction of the optical fiber of various embodiments.

As described herein, for example, in the context of the optical fiber 200 (FIG. 2A), 200b (FIG. 2B), a DHAF is composed of two hollow cores which are connected through an air gap. FIG. 14A shows the transmission spectrum of one core, e.g., core 202b (FIG. 2B), when light from a supercontinuum laser source is coupled into the core. The spectrum shows periodic oscillatory pattern in the wavelength regions from about 1500 nm to about 1800 nm, which originates from the modal interference between first order supermodes and second order supermodes (also indicated in FIG. 14B to be described below). The oscillation deeps may be sensitive to directional bending which may induce structural deformation of the fiber. FIG. 14B defines the bending direction and the core orientation (or direction), and θ is the angle between the core direction and the bending direction.

Figure 14C:
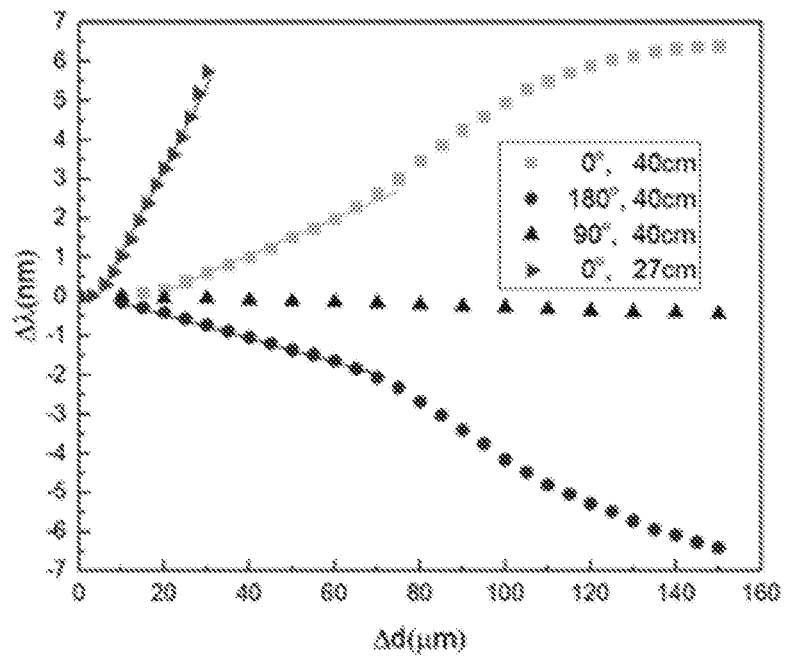
FIG. 14C shows a plot illustrating the relationship between compression distance and wavelength shift of oscillation deeps.
Figure 14D:
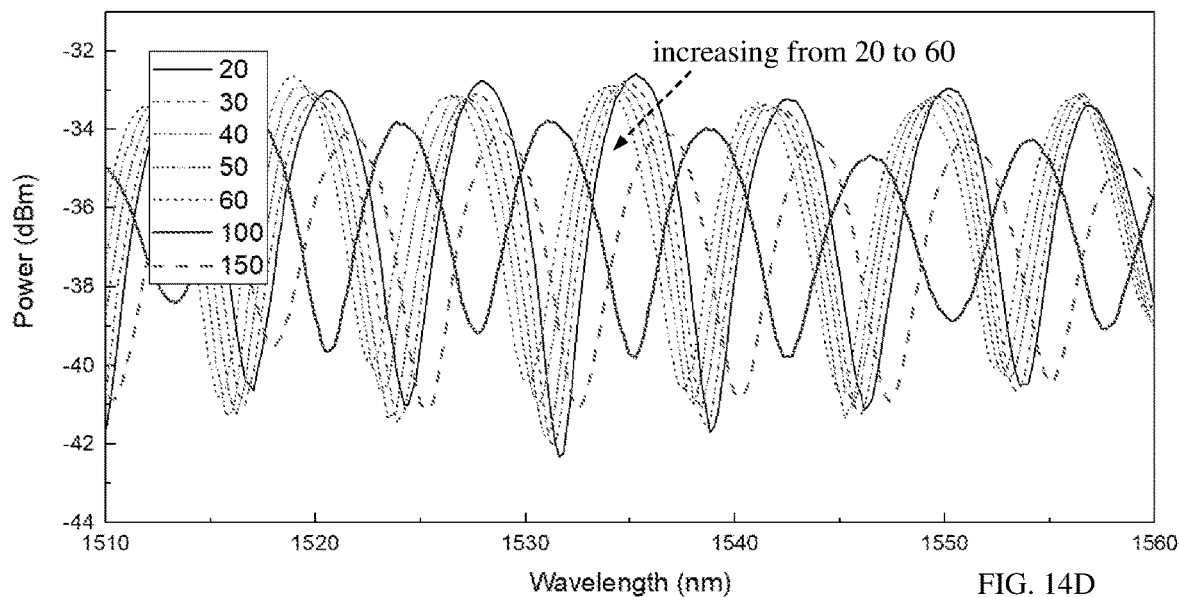
FIG. 14D shows a plot of oscillatory spectra for different compression distances, $\Delta d$, for angle $\theta=0°$.

The direction dependent bending sensitivity of the oscillation deeps is as shown in FIG. 14C. When the bending direction is perpendicular to the core direction (i.e., θ=90°), Δλ (wavelength shift of oscillation deep) remains at zero with the increase in the compression distance, Δd, (which induces fiber bending) (please see triangular data points). When the bending direction is the same as or opposite to the core direction (θ=0° or 180°), Δλ increases (θ=0°) or decreases (θ=180°) the most at the same compression distance, Δd. FIG. 14C also indicates that the DHAF with a shorter length is more sensitive to compression (please refer to the "tilted" triangular data points for θ=0° and fiber length=27 cm, and the circular data points for θ=0° and fiber length=40 cm in FIG. 14C). FIG. 14D plots the oscillatory spectra at different Δd, when θ=0°. The results illustrate that the transmission spectrum shifts to the red side when θ=0°. Further, the results shown in FIGS. 14C and 14D indicate that Δλ may vary linearly in a certain range of Δd.

The linear dependence of Δλ on compression distance is favorable in many applications, for example, in mechanical force sensing. For elastic materials, compression distance is proportional to the mechanical force applied. Therefore, by embedding a DHAF inside elastic materials, Δλ may be in proportion to the mechanical force applied. Based on this mechanism, application of DHAF in gas pressure sensing is demonstrated, as described below.

Figure 15A:
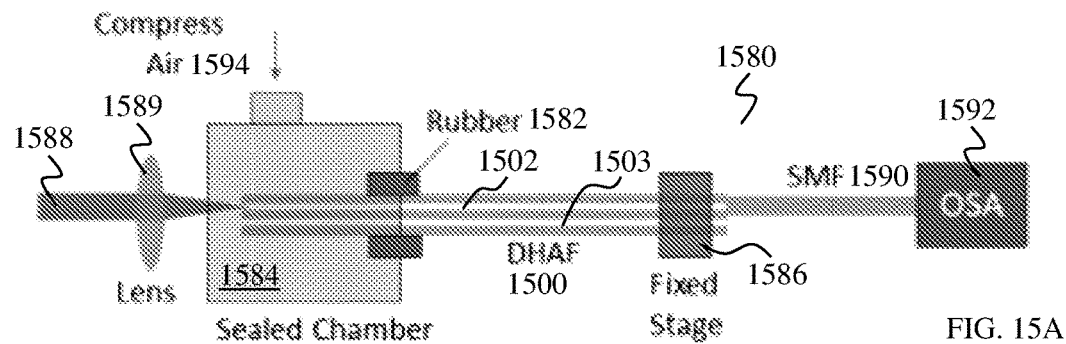
FIG. 15A shows a schematic view of a setup for gas pressure sensing, according to various embodiments.

FIG. 15A shows a schematic view of a setup 1580 for gas pressure sensing. One end of a DHAF 1500 with two cores 1502, 1503 may be fixed to a rubber ring (elastic) 1582 and then fixed to a sealed chamber 1584, whilst the other end of the DHAF 1500 is fixed on a stage 1586. Light 1588 is focused by a lens 1589 into the core 1502 via the end of the DHAF 1500 in the sealed chamber 1584. A single mode fiber (SMF) 1590 may be used to couple light transmitted through the core 1502 from the other end of the DHAF 1500 to an optical spectrum analyzer (OSA) 1592. As compressed air 1594 is filled into the gas chamber 1584, the rubber 1582 is gradually compressed, and so is the DHAF 1500 since it is fixed to the rubber 1582. As a consequence, the measured transmission spectrum may shift gradually as the gas pressure increases.

Figure 15B:
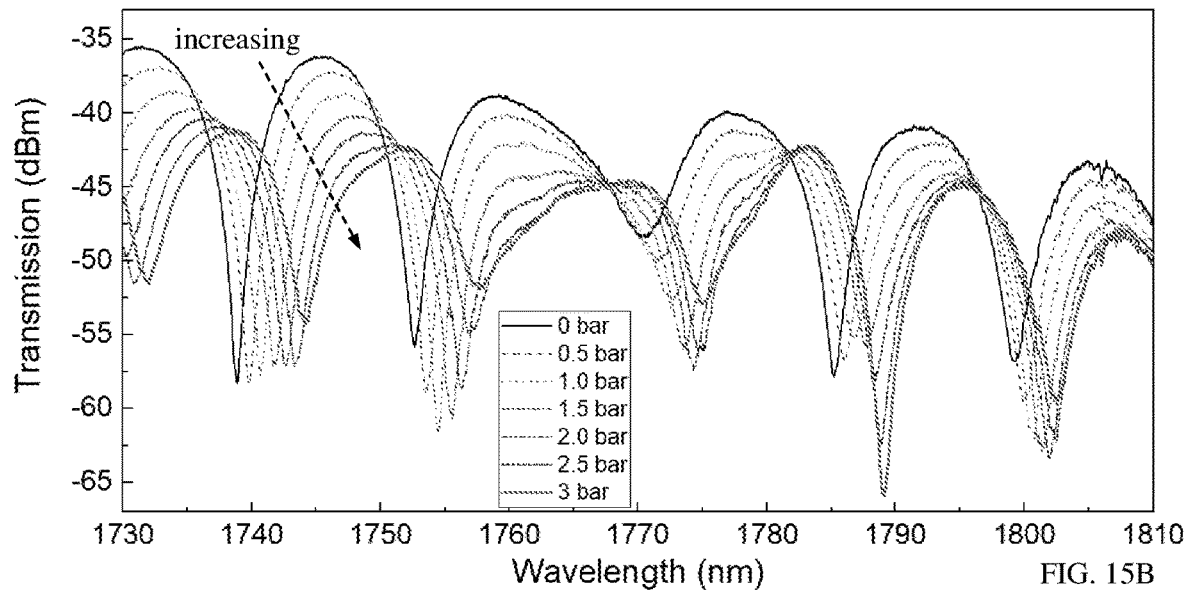
FIG. 15B shows a plot of transmission spectra at different gas pressures.

FIG. 15B shows a plot of transmission spectra at different gas pressures. The fiber length is about 21 cm, and θ=0°. As the gas pressure increases, the transmission spectrum shifts to the blue side. Further, the uniform spacing among the spectra illustrates the linear dependence of Δλ on the gas pressure.

Figure 15C:
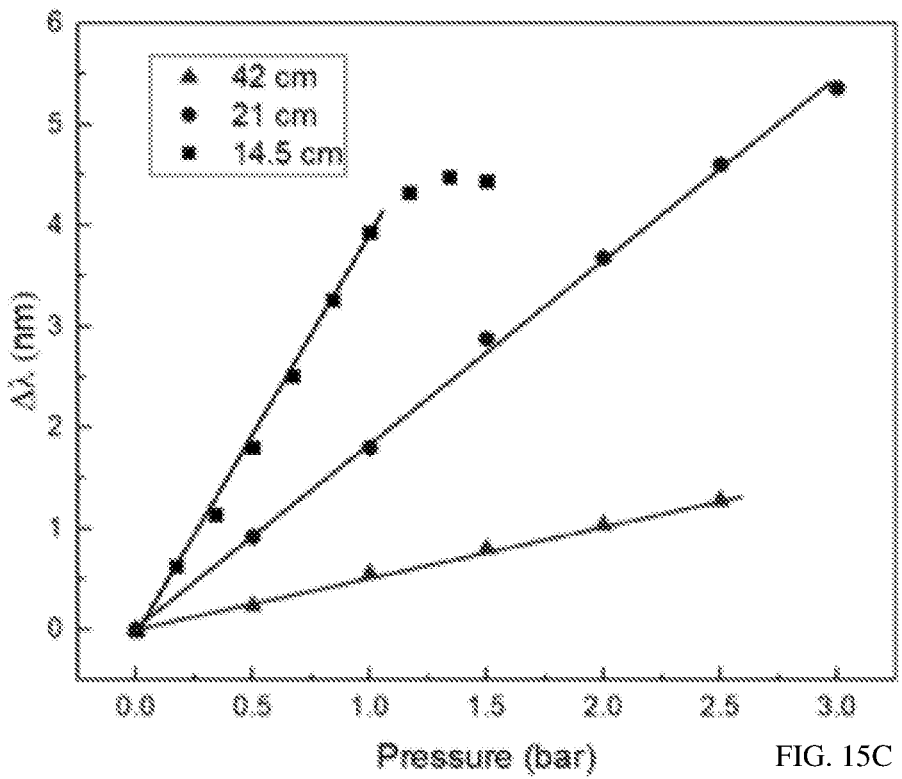
FIG. 15C shows a plot illustrating the relationship between wavelength shift, $\Delta\lambda$, and gas pressure applied, for different fiber lengths.

FIG. 15C shows a plot illustrating the relationship between wavelength shift, Δλ, and gas pressure applied, for different fiber lengths. The results show that the wavelength shift is proportional to the gas pressure applied, while a fiber with a shorter length has a higher sensitivity. As compared in FIG. 15C, by shortening the fiber length from about 42 cm to about 21 cm, the sensitivity may be improved from about 5 nm/MPa to about 18 nm/MPa. Further, shortening the fiber to about 14.5 cm may improve the sensitivity to about 40 nm/MPa, which is much higher than other known fiber based gas pressure sensors. Again, the linear dependence of Δλ on the gas pressure may be inferred from FIG. 15C.

Figure 15D:
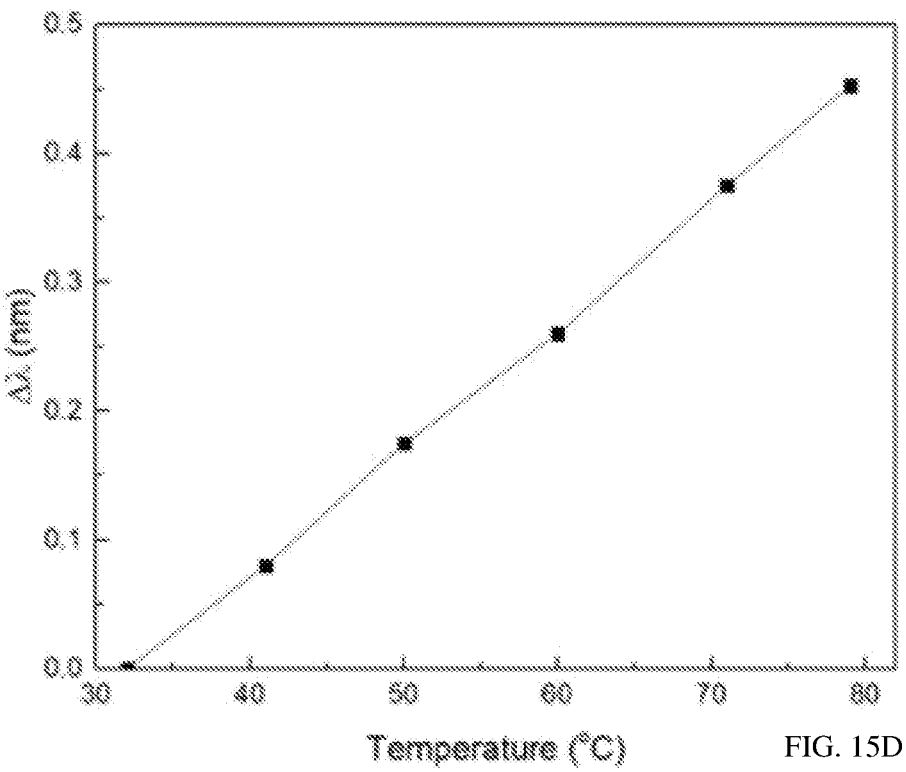
FIG. 15D shows a plot illustrating the relationship between wavelength shift, $\Delta\lambda$, and temperature.

The low temperature sensitivity of the DHAF may also be verified. FIG. 15D shows a plot illustrating the relationship between wavelength shift, Δλ, and temperature. The fiber length is about 21 cm. The temperature sensitivity of a 21 cm fiber is about 9.5 pm/° C., which may be calculated from FIG. 15D. Therefore, for a 21 cm DHAF, the temperature cross sensitivity may be as low as 0.53 KPa/° C., which indicates the stability of DHAF in gas pressure sensing (or even other mechanical force sensing).

As described, various embodiments may provide hollow-core air-gap anti-resonant fibers, and hollow-core air-gap anti-resonant fiber couplers. The hollow-core air-gap anti-resonant fiber coupler has been designed, fabricated and demonstrated in a dual hollow-core anti-resonant fiber (DHAF) structure. Coupling takes place through an air gap between air cores (air-core air-gap coupling), potentially providing a limitless operation window beyond the material transmission. The DHAF follows a similar waveguide mechanism as the hollow-core anti-resonant fiber (HAF). Each core of the DHAF performs as an anti-resonant fiber, and coupling of the anti-resonant band between two cores have been demonstrated. The coupling is attainable over the entire transmission bands determined by a resonant frequency of a HAF. The coupling length, and, thus, the coupling strength, may be controllable by adjusting the fiber design parameters. In addition, at a fixed design and length, the coupling strength may linearly respond to longitudinal mechanical tension, enabling continuous variable coupling ratio in a single coupler. In other words, the fiber may exhibit variable coupling ratio by simply applying a longitudinal strain to the fiber. Furthermore, the coupler is polarization insensitive, and may not require precise polarization alignment of an input beam, thereby making its adoption simpler. As described, its robust coupling performance and applicability in forming a fiber laser ring cavity as an output coupler, and delivering and power splitting ultrafast laser (femtosecond) pulse have been demonstrated. The air-core air-gap coupling and/or uncompromised anti-resonant waveguide mechanism of the fiber of various embodiments may enable applications in mid-infrared and ultraviolet regions where the current fiber couplers or fiber coupling technology is limited.

The DCAF design of various embodiments may enable fabrication of the DCAF with a uniform structure. It has been demonstrated that the DCAF may work as a variable coupler. The DCAF design may offer one or more of the following:
  1. Air gap enabled optical power coupling.
  2. Variable coupling strength by mechanical tension.
  3. Air cores that may be customized for desired operation spectral windows.
  4. Minimal or no optical limitation imposed by material properties.
  5. Design is compatible with glass or polymer materials.
  6. Solid rods that surround the air cores to make the fabrication easy and practical.
  7. Position of the air cores may be arbitrarily located in the structure, by stacking rods and/or capillaries.
  8. The solid rods may be replaced by capillaries. This does not adjust the coupler's properties.
  9. The diameter of the rods may be in a 10-40 μm range.
  10. The outer diameter of capillaries may be in a 10-40 μm range.
  11. The inner diameter of capillaries may be in a 9.9-39.9 μm range.
  12. The inner diameter of the cladding tube may be in a 100-500 μm range.
  13. The size of the core may be in a 10-80 μm range.
  14. The diameter of the coupler (or outer diameter of the cladding tube) may be in a 120-600 μm range.
  15. The length of the coupler may be in a 0.05-2.00 μm range.
  16. The coupler may be connected to air core or solid core fibers for integration into systems or devices.

17. Fabrication is achievable by stack-and-draw, 3D printing, or moulding.
18. The number of air core is scalable.
19. All input ports and output ports of the multi-core coupler may be fiberized via tapered fibers or asymmetric core fibers, to fulfil all-fiber coupler with fiber extension.

Applications may include:
1. Mechanically variable fiber coupler or splitter as an alternative to known fixed ratio couplers or splitters.
2. Applications in a mid-IR or UV laser cavity or resonator.
3. An optical multiplexing device in the emerging air core fiber based network.
4. Ultrafast laser power splitter/delivery.
5. Air core fiber based resonators.
6. Air core fiber based interferometers.
7. Sensors utilising the variable coupling feature.
8. Sensors utilising the air cores to be filled with functional materials, and with combination with the above.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A fiber preform or an optical fiber comprising:
a core region comprising a plurality of cores, wherein two cores of the plurality of cores are bridged by an air gap, wherein the air gap is defined offset from a center of the core region; and
a cladding arrangement comprising:
    a first cladding region comprising a plurality of structures surrounding the core region, and
    a second cladding region in between the core region and the first cladding region, the second cladding region comprising a plurality of tubes, wherein at least one split is defined in the second cladding region.

2. The fiber preform or the optical fiber as claimed in claim 1, wherein the at least one split extends through the second cladding region entirely in a direction from the core region to the first cladding region.

3. The fiber preform or the optical fiber as claimed in claim 1, wherein the at least one split extends in a radial direction from a core of the plurality of cores to the first cladding region.

4. The fiber preform or the optical fiber as claimed in claim 1, wherein the plurality of structures are arranged in a plurality of layers surrounding the core region.

5. The optical fiber as claimed in claim 1, further comprising a sensing material.

6. The optical fiber as claimed in claim 1, wherein the optical fiber is configured to act as an in-fiber interferometer for sensing.

7. A method for forming an optical fiber, the method comprising drawing the fiber preform as claimed in claim 1 into the optical fiber.

8. An optical coupler comprising:
the optical fiber as claimed in claim 1; and
means for changing a light coupling ratio between the plurality of cores of the optical fiber.

9. The optical coupler as claimed in claim 8, wherein the means comprises two support structures arranged to support the optical fiber, and wherein the two support structures are adapted to provide a relative movement between the two support structures.

10. A method comprising changing a light coupling ratio between the plurality of cores of the optical fiber as claimed in claim 1.

11. The method as claimed in claim 10, wherein changing a light coupling ratio comprises controlling a relative movement between two support structures supporting the optical fiber.

12. An optical combiner comprising:
the optical fiber as claimed in claim 1, wherein the core region of the optical fiber comprises three cores; and
an optical arrangement configured to supply a first light to a first core of the three cores, and a second light to a second core of the three cores.

13. A method for optical combining comprising:
supplying a first light to a first core of the three cores of the optical combiner as claimed in claim 12; and
supplying a second light to a second core of the three cores.

14. An optical apparatus comprising:
the optical fiber as claimed in claim 1; and
at least one optical device optically coupled to the optical fiber.

15. The optical apparatus as claimed in claim 14, wherein the at least one optical device comprises a tapered optical fiber optically coupled to a core of the plurality of cores of the optical fiber.

16. The optical apparatus as claimed in claim 14, wherein the at least one optical device comprises an asymmetric core fiber optically coupled to a core of the plurality of cores of the optical fiber.

17. A method for forming an optical apparatus comprising:
optically coupling the optical fiber as claimed in claim 1, and at least one optical device to each other.

18. A method for forming a fiber preform, the method comprising:
arranging a plurality of tubes to define a core region of the fiber preform, the core region comprising a plurality of cores, wherein two cores of the plurality of cores are bridged by an air gap, wherein the plurality of tubes define a second cladding region of the fiber preform, and wherein at least one split is defined in the second cladding region, and wherein the air gap is defined offset from a center of the core region; and
arranging a plurality of structures to surround the core region, the plurality of structures defining a first cladding region of the fiber preform, wherein the second cladding region is between the core region and the first cladding region.

* * * * *